United States Patent
Evans

(10) Patent No.: US 9,984,484 B2
(45) Date of Patent: May 29, 2018

(54) COMPUTER-IMPLEMENTED SYSTEM AND METHOD FOR CLUSTER SPINE GROUP ARRANGEMENT

(71) Applicant: FTI TECHNOLOGY LLC, Annapolis, MD (US)

(72) Inventor: Lynne Marie Evans, Renton, WA (US)

(73) Assignee: FTI Consulting Technology LLC, Annapolis, MD (US)

( * ) Notice: Subject to any disclaimer, the term of this patent is extended or adjusted under 35 U.S.C. 154(b) by 0 days. days.

(21) Appl. No.: 15/805,054

(22) Filed: Nov. 6, 2017

(65) Prior Publication Data

US 2018/0061099 A1    Mar. 1, 2018

Related U.S. Application Data

(63) Continuation of application No. 15/484,096, filed on Apr. 10, 2017, now Pat. No. 9,811,930, which is a
(Continued)

(51) Int. Cl.
*G06K 9/62*    (2006.01)
*G06T 11/20*    (2006.01)
(Continued)

(52) U.S. Cl.
CPC ...... *G06T 11/206* (2013.01); *G06F 17/30011* (2013.01); *G06F 17/3053* (2013.01);
(Continued)

(58) Field of Classification Search
CPC ....... Y10S 707/99935; G06F 17/30713; G06F 17/30601; G06F 17/30598; G06F 17/30705; G06F 17/30011; G06F 17/3053; G06F 17/3071; G06F 17/30867; G06T 11/206; G06T 11/60; G06T 2200/32; G06K 9/62; G06K 9/00469
USPC ......................................................... 382/225
See application file for complete search history.

(56) References Cited

U.S. PATENT DOCUMENTS 3,416,150 A    12/1968    Lindberg
3,426,210 A    2/1969    Agin
(Continued)

FOREIGN PATENT DOCUMENTS

EP    0886227    6/1998
EP    1049030    1/2005
(Continued)

OTHER PUBLICATIONS

Anna Sachinopoulou, "Multidimensional Visualization," Technical Research Centre of Finland, Espoo 2001, VTT Research Notes 2114, pp. 1-37 (2001).
(Continued)

*Primary Examiner* — Daniel Mariam
(74) *Attorney, Agent, or Firm* — Patrick J. S. Inouye; Krista A. Wittman

(57) ABSTRACT

A computer-implemented system and method for cluster spine group arrangement is provided. A set of spine groups each having one or more spines of clusters and at least one singleton cluster is obtained. Unique spine groups are identified within the set and placed in a center of a display. At least a portion of the remaining spine groups in the set are placed to extend radially from the unique spine groups in the display center.

20 Claims, 28 Drawing Sheets

Related U.S. Application Data continuation of application No. 15/351,371, filed on Nov. 14, 2016, now Pat. No. 9,619,909, which is a continuation of application No. 15/200,704, filed on Jul. 1, 2016, now Pat. No. 9,495,779, which is a continuation of application No. 15/005,980, filed on Jan. 25, 2016, now Pat. No. 9,384,573, which is a continuation of application No. 14/798,375, filed on Jul. 13, 2015, now Pat. No. 9,245,367, which is a continuation of application No. 14/605,953, filed on Jan. 26, 2015, now Pat. No. 9,082,232, which is a continuation of application No. 14/444,972, filed on Jul. 28, 2014, now Pat. No. 8,942,488, which is a continuation of application No. 14/165,557, filed on Jan. 27, 2014, now Pat. No. 8,792,733, which is a continuation of application No. 13/758,982, filed on Feb. 4, 2013, now Pat. No. 8,639,044, which is a continuation of application No. 13/442,782, filed on Apr. 9, 2012, now Pat. No. 8,369,627, which is a continuation of application No. 13/179,130, filed on Jul. 8, 2011, now Pat. No. 8,155,453, which is a continuation of application No. 13/022,580, filed on Feb. 7, 2011, now Pat. No. 7,983,492, which is a continuation of application No. 12/781,763, filed on May 17, 2010, now Pat. No. 7,885,468, which is a continuation of application No. 12/254,739, filed on Oct. 20, 2008, now Pat. No. 7,720,292, which is a continuation of application No. 10/911,375, filed on Aug. 3, 2004, now Pat. No. 7,440,622, which is a continuation-in-part of application No. 10/778,416, filed on Feb. 13, 2004, now Pat. No. 7,191,175.

(51) Int. Cl.
*G06F 17/30* (2006.01)
*G06K 9/00* (2006.01)
*G06T 11/60* (2006.01)

(52) U.S. Cl.
CPC .... *G06F 17/3071* (2013.01); *G06F 17/30598* (2013.01); *G06F 17/30601* (2013.01); *G06F 17/30675* (2013.01); *G06F 17/30705* (2013.01); *G06F 17/30713* (2013.01); *G06F 17/30867* (2013.01); *G06K 9/00469* (2013.01); *G06K 9/62* (2013.01); *G06K 9/6218* (2013.01); *G06T 11/20* (2013.01); *G06T 11/60* (2013.01); *G06T 2200/32* (2013.01); *Y10S 707/99935* (2013.01)

(56) References Cited

U.S. PATENT DOCUMENTS

| | | |
|---|---|---|
| 3,668,658 A | 6/1972 | Flores et al. |
| 4,893,253 A | 1/1990 | Lodder |
| 4,991,087 A | 2/1991 | Burkowski et al. |
| 5,056,021 A | 10/1991 | Ausborn |
| 5,121,338 A | 6/1992 | Lodder |
| 5,133,067 A | 7/1992 | Hara et al. |
| 5,182,773 A | 1/1993 | Bahl et al. |
| 5,276,789 A | 1/1994 | Besaw et al. |
| 5,278,980 A | 1/1994 | Pedersen et al. |
| 5,359,724 A | 10/1994 | Earle |
| 5,371,673 A | 12/1994 | Fan |
| 5,371,807 A | 12/1994 | Register et al. |
| 5,442,778 A | 8/1995 | Pedersen et al. |
| 5,450,535 A | 9/1995 | North |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,706,497 A | 1/1998 | Takahashi et al. |
| 5,737,734 A | 4/1998 | Schultz |
| 5,754,938 A | 5/1998 | Herz et al. |
| 5,754,939 A | 5/1998 | Herz et al. |
| 5,787,422 A | 7/1998 | Tukey et al. |
| 5,794,178 A | 8/1998 | Caid et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,819,260 A | 10/1998 | Lu et al. |
| 5,835,905 A | 11/1998 | Pirolli et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,895,470 A | 4/1999 | Pirolli et al. |
| 5,909,677 A | 6/1999 | Broder et al. |
| 5,915,024 A | 6/1999 | Kitaori et al. |
| 5,915,249 A | 6/1999 | Spencer |
| 5,920,854 A | 7/1999 | Kirsch et al. |
| 5,924,105 A | 7/1999 | Punch et al. |
| 5,940,821 A | 8/1999 | Wical |
| 5,943,669 A | 8/1999 | Numata |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 5,987,457 A | 11/1999 | Ballard |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,092,091 A | 7/2000 | Sumita et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,134,541 A | 10/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,213 A | 11/2000 | Rennison et al. |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,253,218 B1 | 6/2001 | Aoki et al. |
| 6,260,038 B1 | 7/2001 | Martin et al. |
| 6,300,947 B1 | 10/2001 | Kanebsky |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolosky et al. |
| 6,389,436 B1 | 5/2002 | Chakrabarti et al. |

(56) References Cited

U.S. PATENT DOCUMENTS

| | | |
|---|---|---|
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,635 B1 | 4/2003 | Hu et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,564,202 B1 | 5/2003 | Schuetze et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Cooperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,785,679 B1 | 8/2004 | Dane et al. |
| 6,789,230 B2 | 9/2004 | Katariya et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,826,724 B1 | 11/2004 | Shimada et al. |
| 6,841,321 B2 | 1/2005 | Matsumoto et al. |
| 6,847,966 B1 | 1/2005 | Sommer et al. |
| 6,862,710 B1 | 3/2005 | Marchisio |
| 6,879,332 B2 | 4/2005 | Decombe |
| 6,880,132 B2 | 4/2005 | Uemura |
| 6,883,001 B2 | 4/2005 | Abe |
| 6,886,010 B2 | 4/2005 | Kostoff |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,976,207 B1 | 12/2005 | Rujan et al. |
| 6,978,419 B1 | 12/2005 | Kantrowitz |
| 6,990,238 B1 | 1/2006 | Saffer et al. |
| 6,993,517 B2 | 1/2006 | Naito et al. |
| 6,993,535 B2 | 1/2006 | Rolle et al. |
| 6,996,575 B2 | 2/2006 | Cox et al. |
| 7,003,551 B2 | 2/2006 | Malik |
| 7,013,435 B2 | 3/2006 | Gallo et al. |
| 7,020,645 B2 | 3/2006 | Bisbee et al. |
| 7,039,638 B2 | 5/2006 | Zhang et al. |
| 7,039,856 B2 | 5/2006 | Peairs et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,117,432 B1 | 10/2006 | Shanahan et al. |
| 7,130,807 B1 | 10/2006 | Mikurak |
| 7,137,075 B2 | 11/2006 | Hoshito et al. |
| 7,139,739 B2 | 11/2006 | Agrafiotis et al. |
| 7,146,361 B2 | 12/2006 | Broder et al. |
| 7,155,668 B2 | 12/2006 | Holland et al. |
| 7,158,957 B2 | 1/2007 | Joseph et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cossock |
| 7,209,949 B2 | 4/2007 | Mousseau et al. |
| 7,233,843 B2 | 6/2007 | Budhraja et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Donoho et al. |
| 7,308,451 B1 | 12/2007 | Lamping et al. |
| 7,325,127 B2 | 1/2008 | Olkin et al. |
| 7,363,243 B2 | 1/2008 | Arnett et al. |
| 7,353,204 B2 | 4/2008 | Liu |
| 7,359,894 B1 | 4/2008 | Liebman et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Cooperman et al. |
| 7,412,462 B2 | 8/2008 | Margolus et al. |
| 7,418,397 B2 | 8/2008 | Kojima et al. |
| 7,430,717 B1 | 9/2008 | Spangler |
| 7,433,893 B2 | 10/2008 | Lowry |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,478,403 B1 | 1/2009 | Allavarpu |
| 7,490,092 B2 | 2/2009 | Sibley et al. |
| 7,499,923 B2 | 3/2009 | Kawatani |
| 7,509,256 B2 | 3/2009 | Iwahashi et al. |
| 7,516,419 B2 | 4/2009 | Petro et al. |
| 7,519,565 B2 | 4/2009 | Prakash et al. |
| 7,523,349 B2 | 4/2009 | Barras |
| 7,558,769 B2 | 7/2009 | Scott et al. |
| 7,571,177 B2 | 8/2009 | Damle |
| 7,584,221 B2 | 9/2009 | Robertson et al. |
| 7,603,628 B2 | 10/2009 | Park et al. |
| 7,607,083 B2 | 10/2009 | Gong et al. |
| 7,639,868 B1 | 12/2009 | Regli et al. |
| 7,640,219 B2 | 12/2009 | Perrizo |
| 7,647,345 B2 | 1/2010 | Trepess et al. |
| 7,668,376 B2 | 2/2010 | Lin et al. |
| 7,698,167 B2 | 4/2010 | Batham et al. |

(56) References Cited

U.S. PATENT DOCUMENTS

| | | | |
|---|---|---|---|
| 7,716,223 | B2 | 5/2010 | Haveliwala et al. |
| 7,756,974 | B2 | 7/2010 | Blumenau |
| 7,761,447 | B2 | 7/2010 | Brill et al. |
| 7,885,901 | B2 | 2/2011 | Hull et al. |
| 7,971,150 | B2 | 6/2011 | Raskutti et al. |
| 7,984,014 | B2 | 7/2011 | Song et al. |
| 8,032,409 | B1 | 10/2011 | Mikurak |
| 8,060,259 | B2 | 11/2011 | Budhraja et al. |
| 8,065,156 | B2 | 11/2011 | Gazdzinski |
| 8,132,121 | B2 | 3/2012 | Risch et al. |
| 8,290,778 | B2 | 10/2012 | Gazdzinski |
| 8,296,146 | B2 | 10/2012 | Gazdzinski |
| 8,401,710 | B2 | 3/2013 | Budhraja et al. |
| 8,712,777 | B1 | 4/2014 | Gazdzinski |
| 8,719,037 | B2 | 5/2014 | Gazdzinski |
| 8,719,038 | B1 | 5/2014 | Gazdzinski |
| 8,781,839 | B1 | 7/2014 | Gazdzinski |
| 2002/0002556 | A1 | 1/2002 | Yoshida et al. |
| 2002/0032735 | A1 | 3/2002 | Burnstein et al. |
| 2002/0055919 | A1 | 5/2002 | Mikheev |
| 2002/0065912 | A1 | 5/2002 | Catchpole et al. |
| 2002/0078044 | A1 | 6/2002 | Song et al. |
| 2002/0078090 | A1 | 6/2002 | Hwang et al. |
| 2002/0122543 | A1 | 9/2002 | Rowers |
| 2002/0184193 | A1 | 12/2002 | Cohen |
| 2003/0018652 | A1 | 1/2003 | Heckerman et al. |
| 2003/0046311 | A1 | 3/2003 | Baidya et al. |
| 2003/0084066 | A1 | 5/2003 | Waterman et al. |
| 2003/0110181 | A1 | 6/2003 | Schuetze et al. |
| 2003/0120651 | A1 | 6/2003 | Bernstein et al. |
| 2003/0130991 | A1 | 7/2003 | Reijerse et al. |
| 2003/0172048 | A1 | 9/2003 | Kauffman |
| 2003/0174179 | A1 | 9/2003 | Suermondt et al. |
| 2004/0024739 | A1 | 2/2004 | Copperman et al. |
| 2004/0024755 | A1 | 2/2004 | Rickard |
| 2004/0034633 | A1 | 2/2004 | Rickard |
| 2004/0078577 | A1 | 4/2004 | Feng et al. |
| 2004/0083206 | A1 | 4/2004 | Wu et al. |
| 2004/0133650 | A1 | 7/2004 | Miloushev et al. |
| 2004/0181427 | A1 | 9/2004 | Stobbs et al. |
| 2004/0205482 | A1 | 10/2004 | Basu |
| 2004/0205578 | A1 | 10/2004 | Wolff et al. |
| 2004/0215608 | A1 | 10/2004 | Gourlay |
| 2004/0243556 | A1 | 12/2004 | Ferrucci et al. |
| 2005/0004949 | A1 | 1/2005 | Trepess et al. |
| 2005/0025357 | A1 | 2/2005 | Landwehr et al. |
| 2005/0091211 | A1 | 4/2005 | Vernau et al. |
| 2005/0097435 | A1 | 5/2005 | Prakash et al. |
| 2005/0171772 | A1 | 8/2005 | Iwahashi et al. |
| 2005/0203924 | A1 | 9/2005 | Rosenberg |
| 2005/0283473 | A1 | 12/2005 | Rousso et al. |
| 2006/0008151 | A1 | 1/2006 | Lin et al. |
| 2006/0012297 | A1 | 1/2006 | Lee et al. |
| 2006/0021009 | A1 | 1/2006 | Lunt |
| 2007/0020642 | A1 | 1/2007 | Deng et al. |
| 2007/0043774 | A1 | 2/2007 | Davis et al. |
| 2007/0112758 | A1 | 5/2007 | Livaditis |
| 2007/0214133 | A1 | 9/2007 | Liberty et al. |
| 2008/0162478 | A1 | 7/2008 | Pugh et al. |
| 2009/0222444 | A1 | 5/2009 | Chowdhury et al. |

FOREIGN PATENT DOCUMENTS

| | | |
|---|---|---|
| WO | 200067162 | 11/2000 |
| WO | 2003052627 | 6/2003 |
| WO | 2003060766 | 7/2003 |
| WO | 2005073881 | 8/2005 |
| WO | 2006008733 | 1/2006 |

OTHER PUBLICATIONS

S.S.Weng, C.K.Liu, "Using text classification and multiple concepts to answer emails." Expert Systems with Applications, 26 (2004), pp. 529-543.

B.B. Hubbard, "The World According the Wavelet: The Story of a Mathematical Technique in the Making," AK Peters (2nd ed.), pp. 227-229, Massachusetts, USA (1998).

Baeza-Yates et al., "Modern Information Retrieval," Ch. 2 "Modeling," Modern Information Retrieval, Harlow: Addison-Wesley, Great Britain 1999, pp. 18-71 (1999).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809 (2003).

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Boukhelifa et al., "A Model and Software System for Coordinated and Multiple Views in Exploratory Visualization," Information Visualization, No. 2, pp. 258-269, GB (2003).

C. Yip Chung et al., "Thematic Mapping—From Unstructured Documents to Taxonomies," CIKM'02, Nov. 4-9, 2002, pp. 608-610, ACM, McLean, Virginia, USA (Nov. 4, 2002).

Chen AN et al., "Fuzzy Concept Graph and Application in Web Document Clustering," IEEE, pp. 101-106 (2001).

Davison et al. "Brute Force Estimation of the Number of Human Genes Using EST Clustering as a Measure," IBM Journal of Research & Development, vol. 45, pp. 439-447 (May 1997).

D. Sullivan, "Document Warehousing and Text Mining: Techniques for Improving Business Operations, Marketing and Sales," Ch. 1-3, John Wiley & Sons, New York, NY (2001).

DeLoura et al., Game Programming Gems 2, Charles River Media, Inc., pp. 182-190, 2001.

Eades et al. "Multilevel Visualization of Clustered Graphs," Department of Computer Science and Software Engineering, University if Newcastle, Australia, Proceedings of Graph Drawing '96, Lecture Notes in Computer Science, NR. 1190, (Sep. 1996).

Eades et al., "Orthogonal Grid Drawing of Clustered Graphs," Department of Computer Science, the University of Newcastle, Australia, Technical Report 96-04, [Online] 1996, Retrieved from the internet: URL: http://citeseer.ist.psu.edu/eades96ort hogonal.html (1996).

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, No. 2, Jun. 1999, pp. 49-60, Philadelphia, PA, USA (Jun. 1999).

F. Can, Incremental Clustering for Dynamic Information Processing: ACM Transactions on Information Systems, ACM, New York, NY, US, vol. 11, No. 2, pp. 143-164, XP-002308022 (Apr. 1993).

Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).

H. Kawano, "Overview of Mondou Web Search Engine Using Text Mining and Information Visualizing Technologies," IEEE, 2001, pp. 234-241 (2001).

http://em-ntserver.unl.edu/Math/mathweb/vecors/vectors.html © 1997.

Whiting et al., "Image Quantization: Statistics and Modeling," SPIE Conference of Physics of Medical Imaging, San Diego, CA, USA, vol. 3336, pp. 260-271 (Feb. 1998).

Jain et al., "Data Clustering: A Review," ACM Computing Surveys, vol. 31, No. 3, Sep. 1999, pp. 264-323, New York, NY, USA (Sep. 1999).

Jiang Linhui, "K-Mean Algorithm: Iterative Partitioning Clustering Algorithm," http://www.cs.regina.ca/-linhui/K.sub.—mean.sub.—algorithm.html, (2001) Computer Science Department, University of Regina, Saskatchewan, Canada (2001).

Kanungo et al., "The Analysis of a Simple K-Means Clustering Algorithm," pp. 100-109, PROC 16th annual symposium of computational geometry (May 2000).

(56) References Cited

OTHER PUBLICATIONS

Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).
Kohonen, "Self-Organizing Maps," Ch. 1-2, Springer-Verlag (3rd ed.) (2001).
Kurimo, "Fast Latent Semantic Indexing of Spoken Documents by Using Self-Organizing Maps" IEEE International Conference on Accoustics, Speech, and Signal Processing, vol. 6, pp. 2425-2428 (Jun. 2000).
Lam et al., "A Sliding Window Technique for Word Recognition," SPIE, vol. 2422, pp. 38-46, Center of Excellence for Document Analysis and Recognition, State University of New Yrok at Baffulo, NY, USA (1995).
Lio et al., "Funding Pathogenicity Islands and Gene Transfer Events in Genome Data," Bioinformatics, vol. 16, pp. 932-940, Department of Zoology, University of Cambridge, UK (Jan. 25, 2000).
Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).
Magarshak, Theory & Practice. Issue 01. May 17, 2000. http://www.flipcode.com/articles/tp.sub.—issue01-pf.shtml (May 17, 2000).
Maria Cristin Ferreira De Oliveira et al., "From Visual Data Exploration to Visual Data Mining: A Survey," Jul.-Sep. 2003, IEEE Transactions onVisualization and Computer Graphics, vol. 9, No. 3, pp. 378-394 (Jul. 2003).
V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).
Miller et al., "Topic Islands: A Wavelet Based Text Visualization System," Proceedings of the IEEE Visualization Conference. 1998, pp. 189-196.
North et al. "A Taxonomy of Multiple Window Coordinations," Institute for Systems Research & Department of Computer Science, University of Maryland, Maryland, USA, http://drum.lib.umd.edu/bitstream/1903/927/2/CS-TR-3854.pdf (1997).
Cutting, Douglass R., et al. "Scatter/gather: A cluster-based approach to browsing large document collections." Proceedings of the 15th annual international ACM SIGIR conference on Research and development in information retrieval. ACM, 1992.
Osborn et al., "Justice: A Jidicial Search Tool Using Intelligent Cencept Extraction," Department of Computer Science and Software Engineering, University of Melbourne, Australia, ICAIL-99, 1999, pp. 173-181, ACM (1999).
Paul N. Bennet et al., "Probabilistic Combination of Text Classifiers Using Reliability Indicators", 2002, ACM, 8 pages.
Pelleg et al., "Accelerating Exact K-Means Algorithms With Geometric Reasoning," pp. 277-281, CONF on Knowledge Discovery in Data, PROC fifth ACM SIGKDD (1999).
Salton G. et al., "Extended Boolean Information Retrieval" Communications of the Association for Computing Machinery, ACM, New York, NY, US., vol. 26, p. 12, Nov. 1, 1983, pig1022-1036, XP000670417.
R.E.Horn, "Visual Language: Global Communication for the 21st Century ," 1998, pp. 51-92, Bainbridge, Washington, USA.
Rauber et al., "Text Mining in the SOMLib Digital Library System: The Representation of Topics and Genres," Applied Intelligence 18, pp. 271-293, 2003 Kluwer Academic Publishers (2003).
Ryall et al., "An Interactive Constraint-Based System for Drawing Graphs," UIST '97 Proceedings of the 10th Annual ACM Symposium on User Interface Software and Technology, pp. 97-104 (1997).
Shuldberg et al., "Distilling Information from Text: The EDS TemplateFiller System," Journal of the American Society for Information Science, vol. 44, pp. 493-507 (1993).
Slaney et al., "Multimedia Edges: Finding Hierarchy in all Dimensions" PROC. 9-th ACM Intl. Conf. on Multimedia, pp. 29-40, ISBN.1-58113-394-4, Sep. 30, 2001, XP002295016 Ottawa (Sep. 30, 2001).
Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

100

COMPUTER-IMPLEMENTED SYSTEM AND METHOD FOR CLUSTER SPINE GROUP ARRANGEMENT

CROSS-REFERENCE TO RELATED APPLICATIONS

This patent application is a continuation of U.S. patent application Ser. No. 15/484,096, filed on Apr. 10, 2017, pending; which is a continuation of U.S. Pat. No. 9,619,909 issued Apr. 11, 2017; which is a continuation of U.S. Pat. No. 9,495,779, issued Nov. 15, 2016; which is a continuation of U.S. Pat. No. 9,384,573, issued Jul. 5, 2016; which is a continuation of U.S. Pat. No. 9,245,367, issued Jan. 26, 2016; which is a continuation of U.S. Pat. No. 9,082,232, issued Jul. 14, 2015; which is a continuation of U.S. Pat. No. 8,942,488, issued Jan. 27, 2015; which is a continuation of U.S. Pat. No. 8,792,733, issued Jul. 29, 2014; which is a continuation of U.S. Pat. No. 8,639,044, issued Jan. 28, 2014; which is a continuation of U.S. Pat. No. 8,369,627, issued Feb. 5, 2013; which is a continuation of U.S. Pat. No. 8,155,453, issued Apr. 10, 2012; which is a continuation of U.S. Pat. No. 7,983,492, issued Jul. 19, 2011; which is a continuation of U.S. Pat. No. 7,885,468, issued Feb. 8, 2011; which is a continuation of U.S. Pat. No. 7,720,292, issued May 18, 2010; which is a continuation of U.S. Pat. No. 7,440,622, issued Oct. 21, 2008; which is a continuation-in-part of U.S. Pat. No. 7,191,175, issued Mar. 13, 2007, the priority dates of which are claimed and the disclosures of which are incorporated by reference.

FIELD

The present invention relates in general to data visualization and, in particular, to a computer-implemented system and method for cluster spine group arrangement.

BACKGROUND

In general, data visualization transforms numeric or textual information into a graphical display format to assist users in understanding underlying trends and principles in the data. Effective data visualization complements and, in some instances, supplants numbers and text as a more intuitive visual presentation format than raw numbers or text alone. However, graphical data visualization is constrained by the physical limits of computer display systems. Two-dimensional and three-dimensional visualized information can be readily displayed. However, visualized information in excess of three dimensions must be artificially compressed if displayed on conventional display devices. Careful use of color, shape and temporal attributes can simulate multiple dimensions, but comprehension and usability become difficult as additional layers of modeling are artificially grafted into a two- or three-dimensional display space.

Mapping multi-dimensional information into a two- or three-dimensional display space potentially presents several problems. For instance, a viewer could misinterpret dependent relationships between discrete objects displayed adjacently in a two or three dimensional display. Similarly, a viewer could erroneously interpret dependent variables as independent and independent variables as dependent. This type of problem occurs, for example, when visualizing clustered data, which presents discrete groupings of related data. Other factors further complicate the interpretation and perception of visualized data, based on the Gestalt principles of proximity, similarity, closed region, connectedness, good continuation, and closure, such as described in R. E. Horn, "Visual Language: Global Communication for the 21$^{st}$ Century," Ch. 3, MacroVU Press (1998), the disclosure of which is incorporated by reference.

Conventionally, objects, such as clusters, modeled in multi-dimensional concept space are generally displayed in two- or three-dimensional display space as geometric objects. Independent variables are modeled through object attributes, such as radius, volume, angle, distance and so forth. Dependent variables are modeled within the two or three dimensions. However, poor cluster placement within the two or three dimensions can mislead a viewer into misinterpreting dependent relationships between discrete objects.

Consider, for example, a group of clusters, which each contain a group of points corresponding to objects sharing a common set of traits. Each cluster is located at some distance from a common origin along a vector measured at a fixed angle from a common axis. The radius of each cluster reflects the number of objects contained. Clusters located along the same vector are similar in traits to those clusters located on vectors separated by a small cosine rotation. However, the radius and distance of each cluster from the common origin are independent variables relative to other clusters. When displayed in two dimensions, the overlaying or overlapping of clusters could mislead the viewer into perceiving data dependencies between the clusters where no such data dependencies exist.

Conversely, multi-dimensional information can be advantageously mapped into a two- or three-dimensional display space to assist with comprehension based on spatial appearances. Consider, as a further example, a group of clusters, which again each contain a group of points corresponding to objects sharing a common set of traits and in which one or more "popular" concepts or traits frequently appear in some of the clusters. Since the distance of each cluster from the common origin is an independent variable relative to other clusters, those clusters that contain popular concepts or traits may be placed in widely separated regions of the display space and could similarly mislead the viewer into perceiving no data dependencies between the clusters where such data dependencies exist.

The placement of cluster groups within a two-dimensional display space, such as under a Cartesian coordinate system, also imposes limitations on semantic interrelatedness, density and user interface navigation. Within the display space, cluster groups can be formed into "spines" of semantically-related clusters, which can be placed within the display space with semantically-related groups of cluster spines appearing proximally close to each other and semantically-unrelated cluster spine groups appearing in more distant regions. This form of cluster spine group placement, however, can be potentially misleading. For instance, larger cluster spine groups may need to be placed to accommodate the placement of smaller cluster spine groups while sacrificing the displaying of the semantic interrelatedness of the larger cluster spine groups. Moreover, the density of the overall display space is limited pragmatically and the placement of too many cluster spine groups can overload the user. Finally, navigation within such a display space can be unintuitive and cumbersome, as large cluster spine group placement is driven by available display space and the provisioning of descriptive labels necessarily overlays or intersects placed cluster spine groups.

One approach to depicting thematic relationships between individual clusters applies a force-directed or "spring" algorithm. Clusters are treated as bodies in a virtual physical system. Each body has physics-based forces acting on or between them, such as magnetic repulsion or gravitational attraction. The forces on each body are computed in discrete time steps and the positions of the bodies are updated. However, the methodology exhibits a computational complexity of order $O(n^2)$ per discrete time step and scales poorly to cluster formations having a few hundred nodes. Moreover, large groupings of clusters tend to pack densely within the display space, thereby losing any meaning assigned to the proximity of related clusters.

Therefore, there is a need for an approach to providing a visual display space reflecting tighter semantic interrelatedness of cluster spine groups with increased display density. Preferably, such an approach would further form the cluster spine groups by semantically relating entire cluster spines, rather than individual anchor points within each cluster spine.

There is a further need for an approach to orienting semantically-related cluster spine groups within a two-dimensional visual display space relative to a common point of reference, such as a circle. Preferably, such an approach would facilitate improved user interface features through increased cluster spine group density and cluster spine group placement allowing improved descriptive labeling.

SUMMARY

Relationships between concept clusters are shown in a two-dimensional display space by combining connectedness and proximity. Clusters sharing "popular" concepts are identified by evaluating thematically-closest neighboring clusters, which are assigned into linear cluster spines arranged to avoid object overlap. The cluster arrangement methodology exhibits a highly-scalable computational complexity of order $O(n)$.

An embodiment provides a computer-implemented system and method for cluster spine group arrangement. A set of spine groups each having one or more spines of clusters and at least one singleton cluster is obtained. Unique spine groups are identified within the set and placed in a center of a display. At least a portion of the remaining spine groups in the set are placed to extend radially from the unique spine groups in the display center.

Still other embodiments of the present invention will become readily apparent to those skilled in the art from the following detailed description, wherein are one embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Concept: One or more preferably root stem normalized words defining a specific meaning.

Theme: One or more concepts defining a semantic meaning.

Cluster: Grouping of documents containing one or more common themes.

Spine: Grouping of clusters sharing a single concept preferably arranged linearly along a vector. Also referred to as a cluster spine.

Spine Group: Set of connected and semantically-related spines.

The foregoing terms are used throughout this document and, unless indicated otherwise, are assigned the meanings presented above.

System Overview

Figure 1:
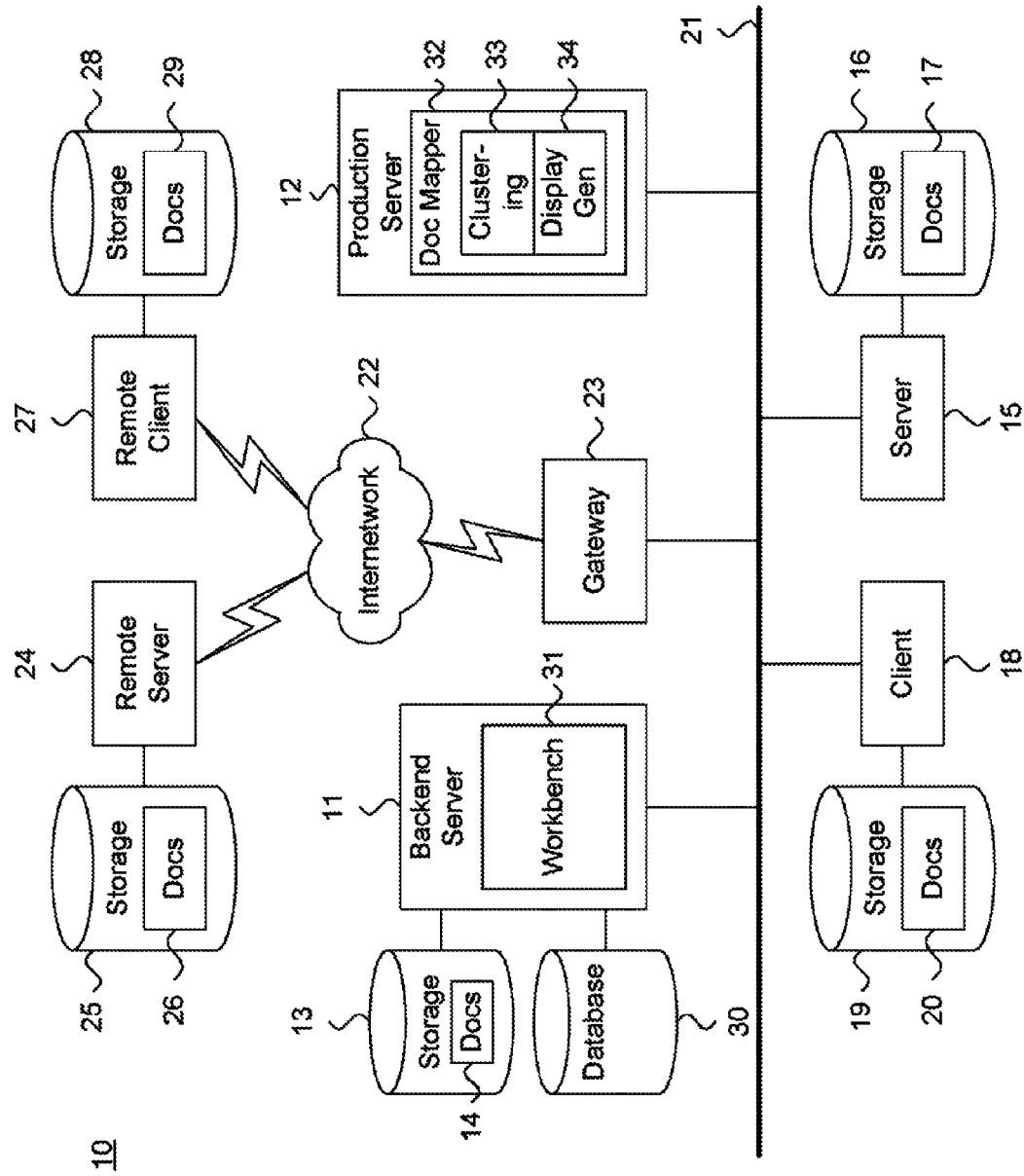
FIG. 1 is a block diagram showing a system for arranging concept clusters in thematic neighborhood relationships in a shaped two-dimensional visual display space, in accordance with the present invention.

FIG. 1 is a block diagram showing a system 10 for arranging concept clusters in thematic neighborhood relationships in a shaped two-dimensional visual display space, in accordance with the present invention. By way of illustration, the system 10 operates in a distributed computing environment, which includes a plurality of heterogeneous systems and document sources. A backend server 11 executes a workbench suite 31 for providing a user interface framework for automated document management, processing and analysis. The backend server 11 is coupled to a storage device 13, which stores documents 14, in the form of structured or unstructured data, and a database 30 for maintaining document information. A production server 12 includes a document mapper 32, that includes a clustering engine 33 and display generator 34. The clustering engine 33 performs efficient document scoring and clustering, such as described in commonly-assigned U.S. Pat. No. 7,610,313, issued Oct. 27, 2009, the disclosure of which is incorporated by reference. The display generator 34 arranges concept clusters in thematic neighborhood relationships in a two-dimensional visual display space, as further described below beginning with reference to FIG. 2.

The document mapper 32 operates on documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In one embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including backend server 11, production server 32, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Display Generator

Figure 2:
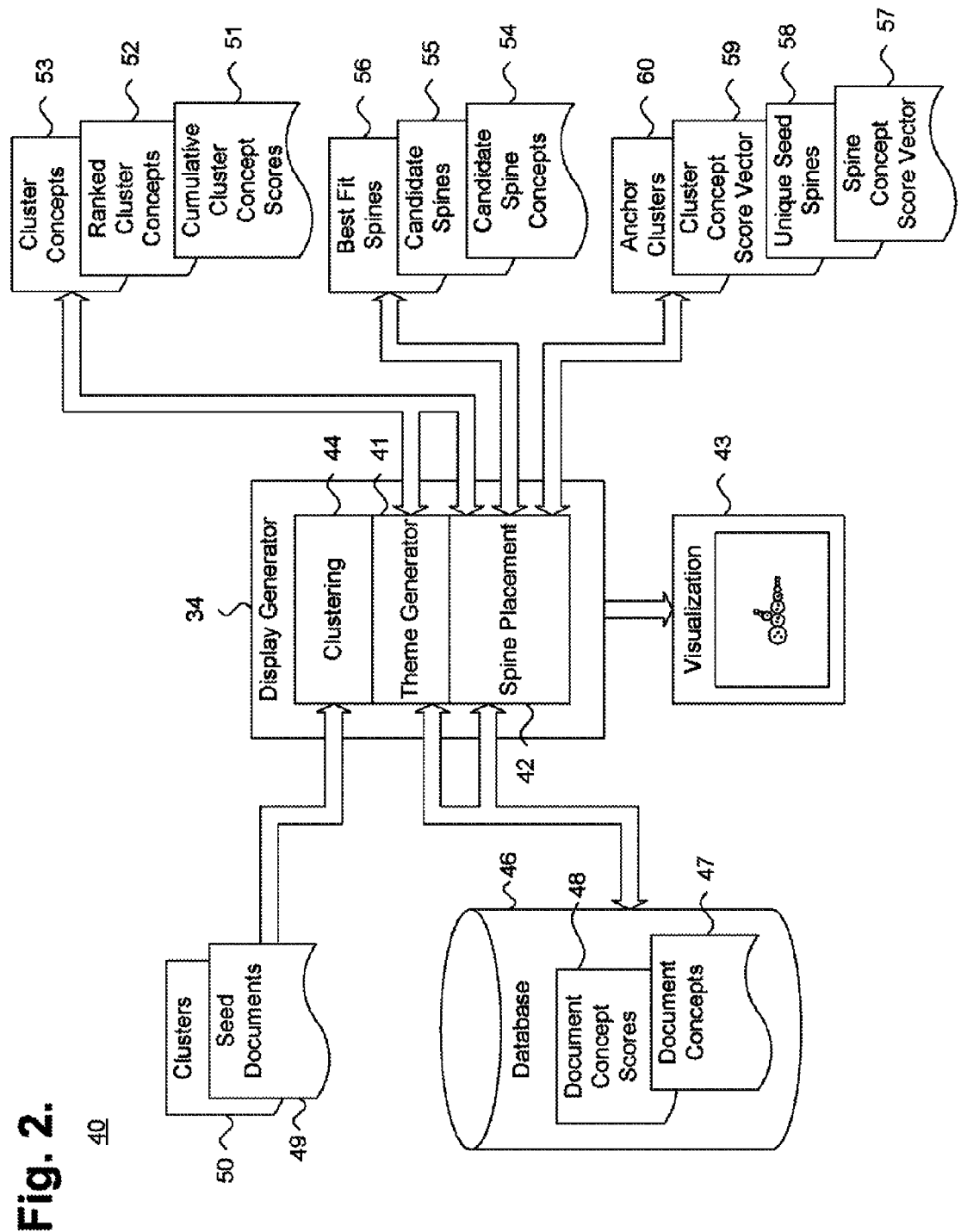
FIG. 2 is a block diagram showing the system modules implementing the display generator of FIG. 1.

FIG. 2 is a block diagram 40 showing the system modules implementing the display generator 34 of FIG. 1. The display generator 34 includes clustering 44, theme generator 41 and spine placement 42 components and maintains attached storage 44 and database 46. Individual documents 14 are analyzed by the clustering component 44 to form clusters 50 of semantically scored documents, such as described in commonly-assigned U.S. Pat. No. 7,610,313, issued Oct. 27, 2009, the disclosure of which is incorporated by reference. In one embodiment, document concepts 47 are formed from concepts and terms extracted from the documents 14 and the frequencies of occurrences and reference counts of the concepts and terms are determined. Each concept and term is then scored based on frequency, concept weight, structural weight, and corpus weight. The document concept scores 48 are compressed and assigned to normalized score vectors for each of the documents 14. The similarities between each of the normalized score vectors are determined, preferably as cosine values. A set of candidate seed documents is evaluated to select a set of seed documents 49 as initial cluster centers based on relative similarity between the assigned normalized score vectors for each of the candidate seed documents or using a dynamic threshold based on an analysis of the similarities of the documents 14 from a center of each cluster 15, such as described in commonly-assigned U.S. Pat. No. 7,610,313, issued Oct. 27, 2009, the disclosure of which is incorporated by reference. The remaining non-seed documents are evaluated against the cluster centers also based on relative similarity and are grouped into the clusters 50 based on best-fit, subject to a minimum fit criterion.

The theme generator 41 evaluates the document concepts 47 assigned to each of the clusters 50 and identifies cluster concepts 53 for each cluster 50, as further described below with reference to FIG. 4. Briefly, the document concepts 47 for each cluster 50 are ranked into ranked cluster concepts 52 based on cumulative document concept scores 51. The top-ranked document concepts 47 are designated as cluster concepts 53. In the described embodiment, each cluster concept 53 must also be a document concept 47 appearing in the initial cluster center, be contained in a minimum of two documents 14 or at least 30% of the documents 14 in the cluster 50. Other cluster concept membership criteria are possible.

The cluster placement component 42 places spines and certain clusters 50 into a two-dimensional display space as a visualization 43. The cluster placement component 42 performs four principal functions. First, the cluster placement component 42 selects candidate spines 55, as further described below with reference to FIG. 5. Briefly, the candidate spines 55 are selected by surveying the cluster concepts 53 for each cluster 50. Each cluster concept 53 shared by two or more clusters 50 can potentially form a spine of clusters 50. However, those cluster concepts 53 referenced by just a single cluster 50 or by more than 10% of the clusters 50 are discarded. The remaining clusters 50 are identified as candidate spine concepts 54, which each logically form a candidate spine 55.

Second, the cluster placement component 42 assigns each of the clusters 50 to a best fit spine 56, as further described below with reference to FIG. 6. Briefly, the fit of each candidate spine 55 to a cluster 50 is determined by evaluating the candidate spine concept 54 to the cluster concept 53. The candidate spine 545 exhibiting a maximum fit is selected as the best fit spine 56 for the cluster 50.

Third, the cluster placement component 42 selects and places unique seed spines 58, as further described below with reference to FIG. 7. Briefly, spine concept score vectors 57 are generated for each best fit spine 56 and evaluated. Those best fit spines 56 having an adequate number of assigned clusters 50 and which are sufficiently dissimilar to any previously selected best fit spines 56 are designated and placed as seed spines 58.

The cluster placement component 42 places any remaining unplaced best fit spines 56 and clusters 50 that lack best fit spines 56 into spine groups, as further described below with reference to FIG. 8. Briefly, anchor clusters 60 are selected based on similarities between unplaced candidate spines 55 and candidate anchor clusters. Cluster spines are grown by placing the clusters 50 in similarity precedence to previously placed spine clusters or anchor clusters along vectors originating at each anchor cluster 60. As necessary, clusters 50 are placed outward or in a new vector at a different angle from new anchor clusters 55. Finally, the spine groups are placed within the visualization 43 by translating the spine groups until there is no overlap, such as described in commonly-assigned U.S. Pat. No. 7,271,801, issued Sep. 18, 2007, the disclosure of which is incorporated by reference.

Each module or component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The display generator 32 operates in accordance with a sequence of process steps, as further described below with reference to FIG. 3.

Method Overview

Figure 3:
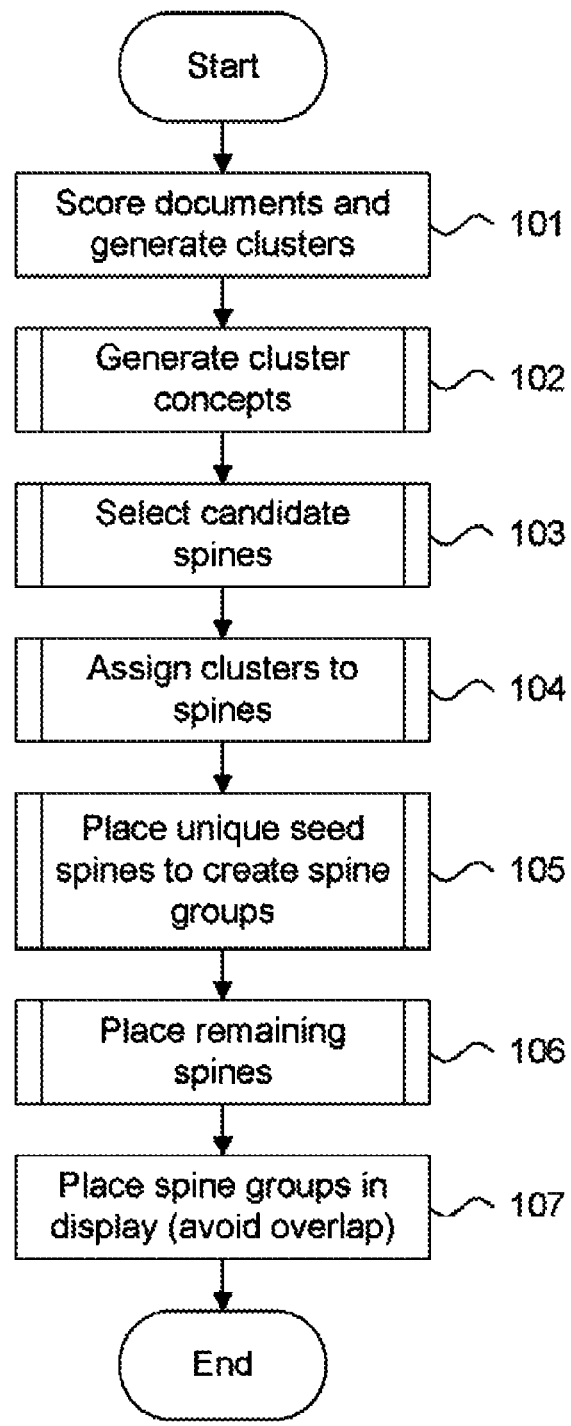
FIG. 3 is a flow diagram showing a method for arranging concept clusters in thematic neighborhood relationships in a shaped two-dimensional visual display space, in accordance with the present invention.

FIG. 3 is a flow diagram showing a method 100 for arranging concept clusters 50 in thematic neighborhood relationships in a two-dimensional visual display space, in accordance with the present invention. The method 80 is described as a sequence of process operations or steps, which can be executed, for instance, by a display generator 32 (shown in FIG. 1).

As an initial step, documents 14 are scored and clusters 50 are generated (block 101), such as described in commonly-assigned U.S. Pat. No. 7,610,313, issued Oct. 27, 2009, the disclosure of which is incorporated by reference. Next, one or more cluster concepts 53 are generated for each cluster 50 based on cumulative cluster concept scores 51 (block 102), as further described below with reference to FIG. 4. The cluster concepts 53 are used to select candidate spines 55 (block 103), as further described below with reference to FIG. 5, and the clusters 50 are then assigned to the candidate spines 55 as best fit spines 56 (block 104), as further described below with reference to FIG. 6. Unique seed spines are identified from the best fit spines 56 and placed to create spine groups (block 105), as further described below with reference to FIG. 7. Any remaining unplaced best fit spines 56 and clusters 50 that lack best fit spines 56 are also identified and placed (block 106), as further described below with reference to FIG. 8. Finally, the spine groups are placed within the visualization 43 in the display space. In the described embodiment, each of the spine groups is placed so as to avoid overlap with other spine groups. In a further embodiment, the spine groups can be placed by similarity to other spine groups. Other cluster, spine, and spine group placement methodologies could also be applied based on similarity, dissimilarity, attraction, repulsion, and other properties in various combinations, as would be appreciated by one skilled in the art. The method then terminates.

Cluster Concept Generation

Figure 4:
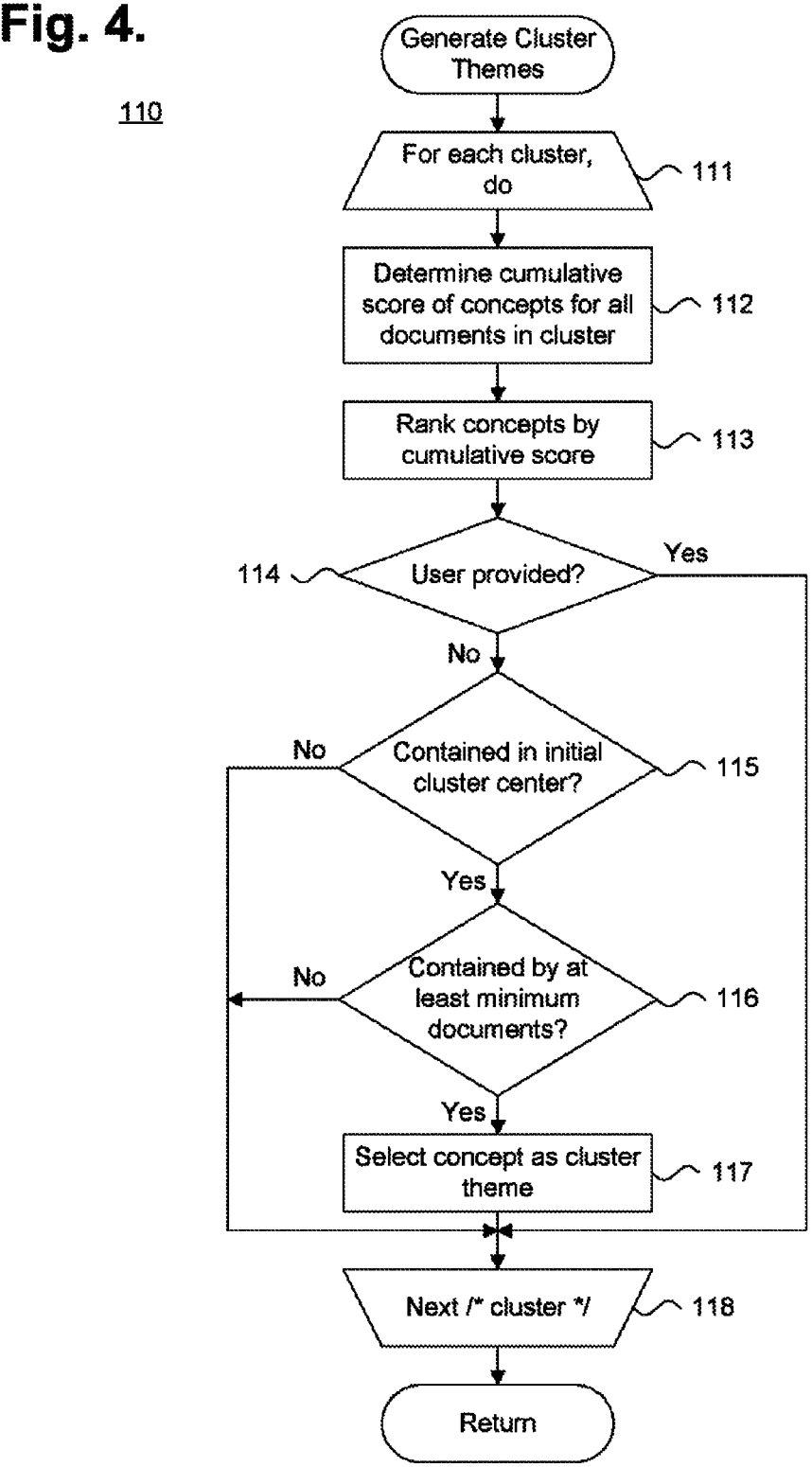
FIG. 4 is a flow diagram showing the routine for generating cluster concepts for use in the method of FIG. 3.

FIG. 4 is a flow diagram showing the routine 110 for generating cluster concepts 53 for use in the method 100 of FIG. 3. One purpose of this routine is to identify the top ranked cluster concepts 53 that best summarizes the commonality of the documents in any given cluster 50 based on cumulative document concept scores 51.

A cluster concept 53 is identified by iteratively processing through each of the clusters 50 (blocks 111-118). During each iteration, the cumulative score 51 of each of the document concepts 47 for all of the documents 14 appearing in a cluster 50 are determined (block 112). The cumulative score 51 can be calculated by summing over the document concept scores 48 for each cluster 50. The document concepts 47 are then ranked by cumulative score 51 as ranked cluster concepts 52 (block 113). In the described embodiment, the ranked cluster concepts 52 appear in descending order, but could alternatively be in ascending order. Next, a cluster concept 53 is determined. The cluster concept 53 can be user provided (block 114). Alternatively, each ranked cluster concept 52 can be evaluated against an acceptance criteria (blocks 115 and 116) to select a cluster concept 53. In the described embodiment, cluster concepts 53 must meet the following criteria:

(1) be contained in the initial cluster center (block 115); and
(2) be contained in a minimum of two documents 14 or 30% of the documents 14 in the cluster 50, whichever is greater (block 116).

The first criteria restricts acceptable ranked cluster concepts 52 to only those document concepts 47 that appear in a seed cluster center theme of a cluster 50 and, by implication, are sufficiently relevant based on their score vectors. Generally, a cluster seed theme corresponds to the set of concepts appearing in a seed document 49, but a cluster seed theme can also be specified by a user or by using a dynamic threshold based on an analysis of the similarities of the documents 14 from a center of each cluster 50, such as described in commonly-assigned U.S. Pat. No. 7,610,313, issued Oct. 27, 2009, the disclosure of which is incorporated by reference The second criteria filters out those document concepts 47 that are highly scored, yet not popular. Other criteria and thresholds for determining acceptable ranked cluster concepts 52 are possible.

If acceptable (blocks 115 and 116), the ranked cluster concept 52 is selected as a cluster concept 53 (block 117) and processing continues with the next cluster (block 118), after which the routine returns.

Candidate Spine Selection

Figure 5:
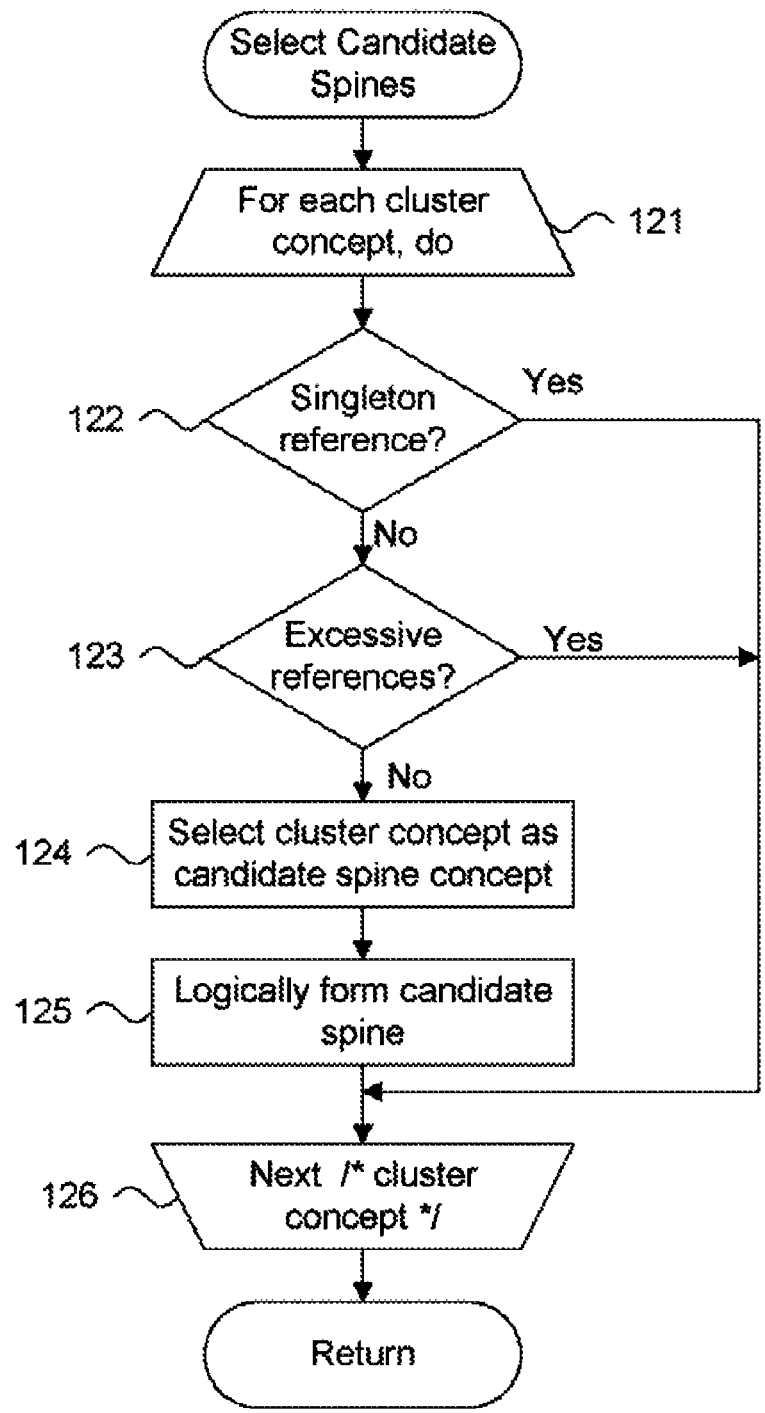
FIG. 5 is a flow diagram showing the routine for selecting candidate spines for use in the method of FIG. 3.

FIG. 5 is a flow diagram showing the routine 120 for selecting candidate spines 55 for use in the method 100 of FIG. 3. One purpose of this routine is to identify candidate spines 55 from the set of all potential spines 55.

Each cluster concept 53 shared by two or more clusters 50 can potentially form a spine of clusters 50. Thus, each cluster concept 53 is iteratively processed (blocks 121-126). During each iteration, each potential spine is evaluated against an acceptance criteria (blocks 122-123). In the described embodiment, a potential spine cannot be referenced by only a single cluster 50 (block 122) or by more than 10% of the clusters 50 in the potential spine (block 123). Other criteria and thresholds for determining acceptable cluster concepts 53 are possible. If acceptable (blocks 122, 123), the cluster concept 53 is selected as a candidate spine concept 54 (block 124) and a candidate spine 55 is logically formed (block 125). Processing continues with the next cluster (block 126), after which the routine returns.

Cluster to Spine Assignment

Figure 6:
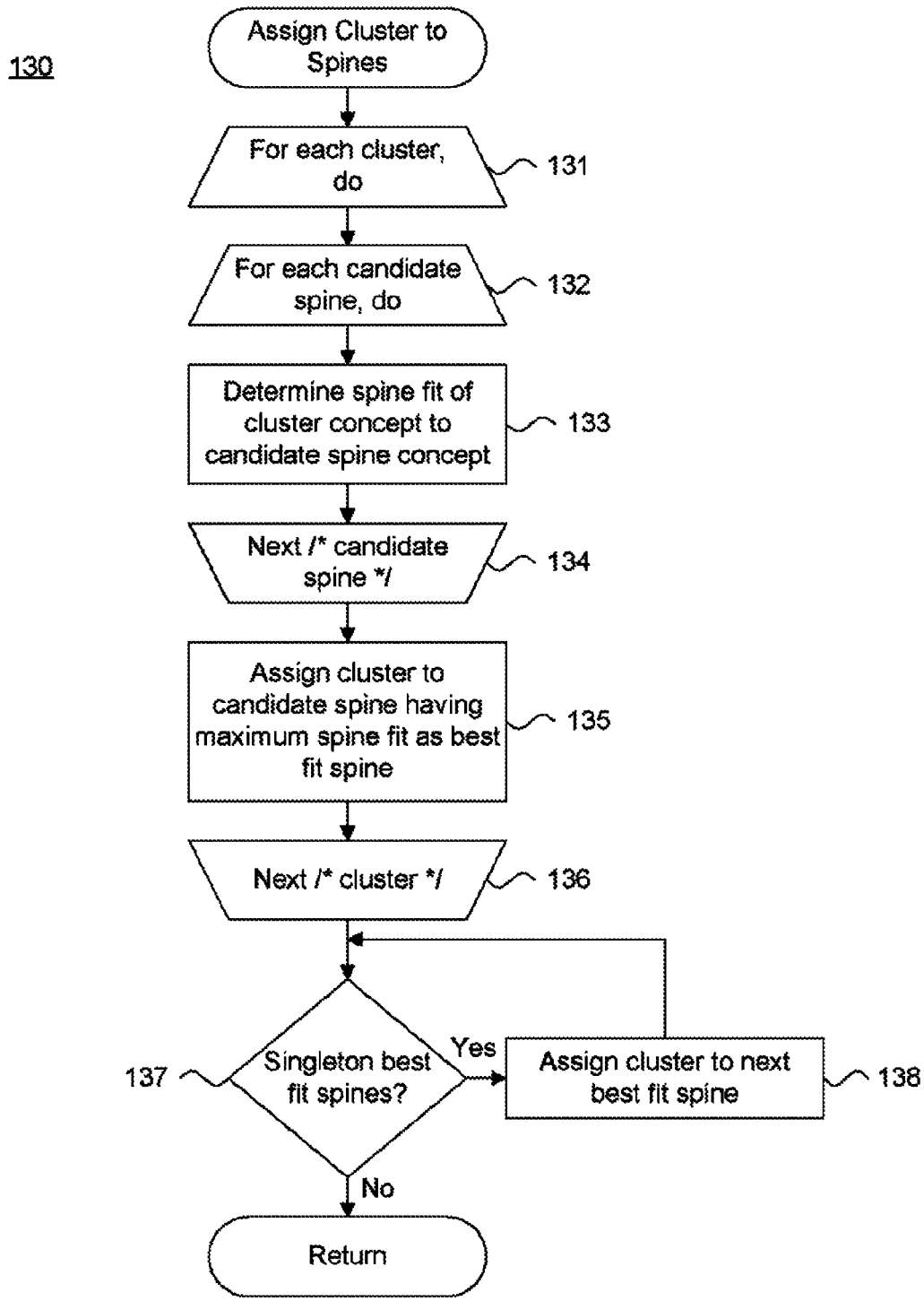
FIG. 6 is a flow diagram showing the routine for assigning clusters to candidate spines for use in the method of FIG. 3.

FIG. 6 is a flow diagram showing the routine 130 for assigning clusters 50 to candidate spines 55 for use in the method 100 of FIG. 3. One purpose of this routine is to match each cluster 50 to a candidate spine 55 as a best fit spine 56.

The best fit spines 56 are evaluated by iteratively processing through each cluster 50 and candidate spine 55 (blocks 131-136 and 132-134, respectively). During each iteration for a given cluster 50 (block 131), the spine fit of a cluster concept 53 to a candidate spine concept 54 is determined (block 133) for a given candidate spine 55 (block 132). In the described embodiment, the spine fit F is calculated according to the following equation:

$$F = \log\left(\frac{popularity}{rank^2}\right) \times scale$$

where popularity is defined as the number of clusters 50 containing the candidate spine concept 54 as a cluster concept 53, rank is defined as the rank of the candidate spine concept 54 for the cluster 50, and scale is defined as a bias factor for favoring a user specified concept or other predefined or dynamically specified characteristic. In the described embodiment, a scale of 1.0 is used for candidate spine concept 54 while a scale of 5.0 is used for user specified concepts. Processing continues with the next candidate spine 55 (block 134). Next, the cluster 50 is assigned to the candidate spine 55 having a maximum spine fit as a best fit spine 56 (block 135). Processing continues with the next cluster 50 (block 136). Finally, any best fit spine 56 that attracts only a single cluster 50 is discarded (block 137) by assigning the cluster 50 to a next best fit spine 56 (block 138). The routine returns.

Generate Unique Spine Group Seeds

Figure 7:
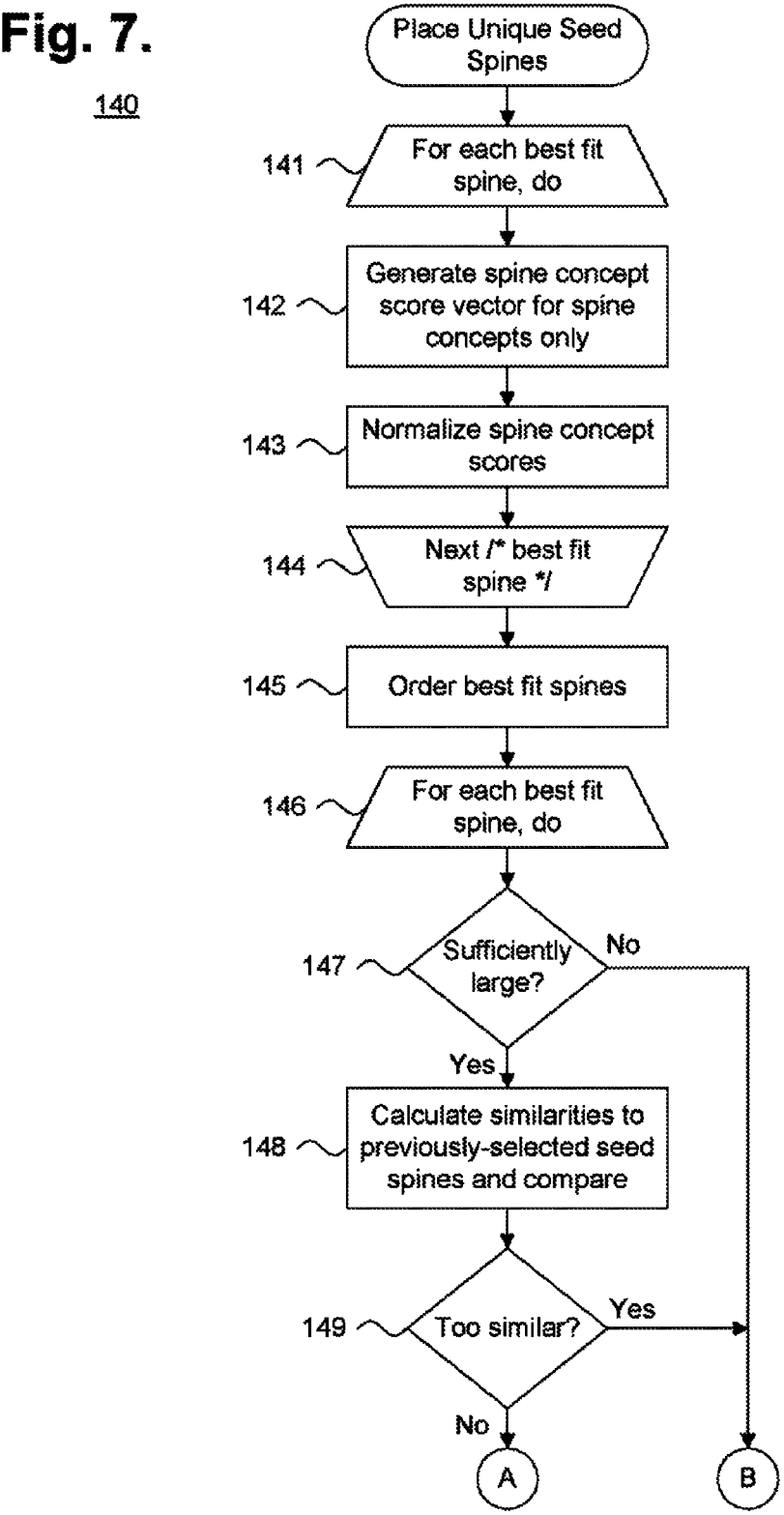
FIG. 7 is a flow diagram showing the routine for placing unique seed spines for use in the method of FIG. 3.
Figure 7:
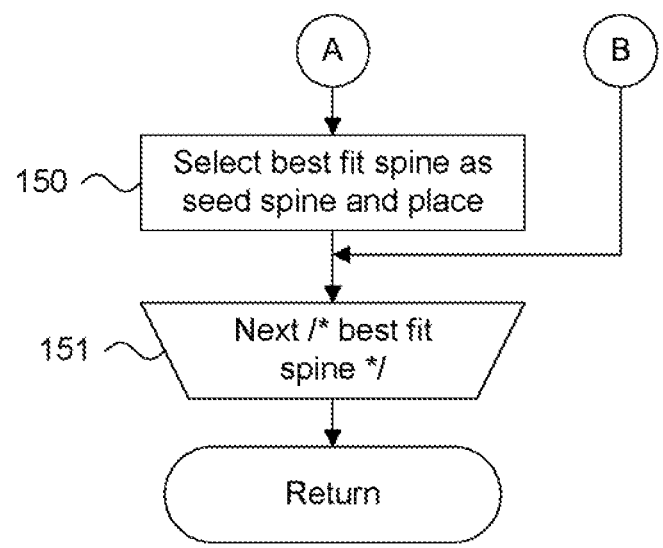

FIG. 7 is a flow diagram showing the routine 140 for placing unique seed spines for use in the method 100 of FIG. 3. One purpose of this routine identify and place best fit spines 56 into the visualization 43 as unique seed spines 58 for use as anchors for subsequent candidate spines 55.

Candidate unique seed spines are selected by first iteratively processing through each best fit spine 56 (blocks 141-144). During each iteration, a spine concept score vector 57 is generated for only those spine concepts corresponding to each best fit spine 56 (block 142). The spine concept score vector 57 aggregates the cumulative cluster concept scores 51 for each of the clusters 50 in the best fit spine 56. Each spine concept score in the spine concept score vector 57 is normalized, such as by dividing the spine concept score by the length of the spine concept score vector 57 (block 143). Processing continues for each remaining best fit spine 56 (block 144), after which the best fit spines 56 are ordered by number of clusters 50. Each best fit spine 56 is again iteratively processed (blocks 146-151). During each iteration, best fit spines 56 that are not sufficiently large are discarded (block 147). In the described embodiment, a sufficiently large best fit spine 56 contains at least five clusters 50. Next, the similarities of the best fit spine 56 to each previously-selected unique seed spine 58 is calculated and compared (block 148). In the described embodiment, best fit spine similarity is calculated as the cosine of the spine concept score vectors 59, which contains the cumulative cluster concept scores 51 for the cluster concepts 53 of each cluster 50 in the best fit spine 56 or previously-selected unique seed spine 58. Best fit spines 56 that are not sufficiently dissimilar are discarded (block 149). Otherwise, the best fit spine 56 is identified as a unique seed spine 58 and is placed in the visualization 43 (block 150). Processing continues with the next best fit spine 56 (block 151), after which the routine returns.

Remaining Spine Placement

Figure 8:
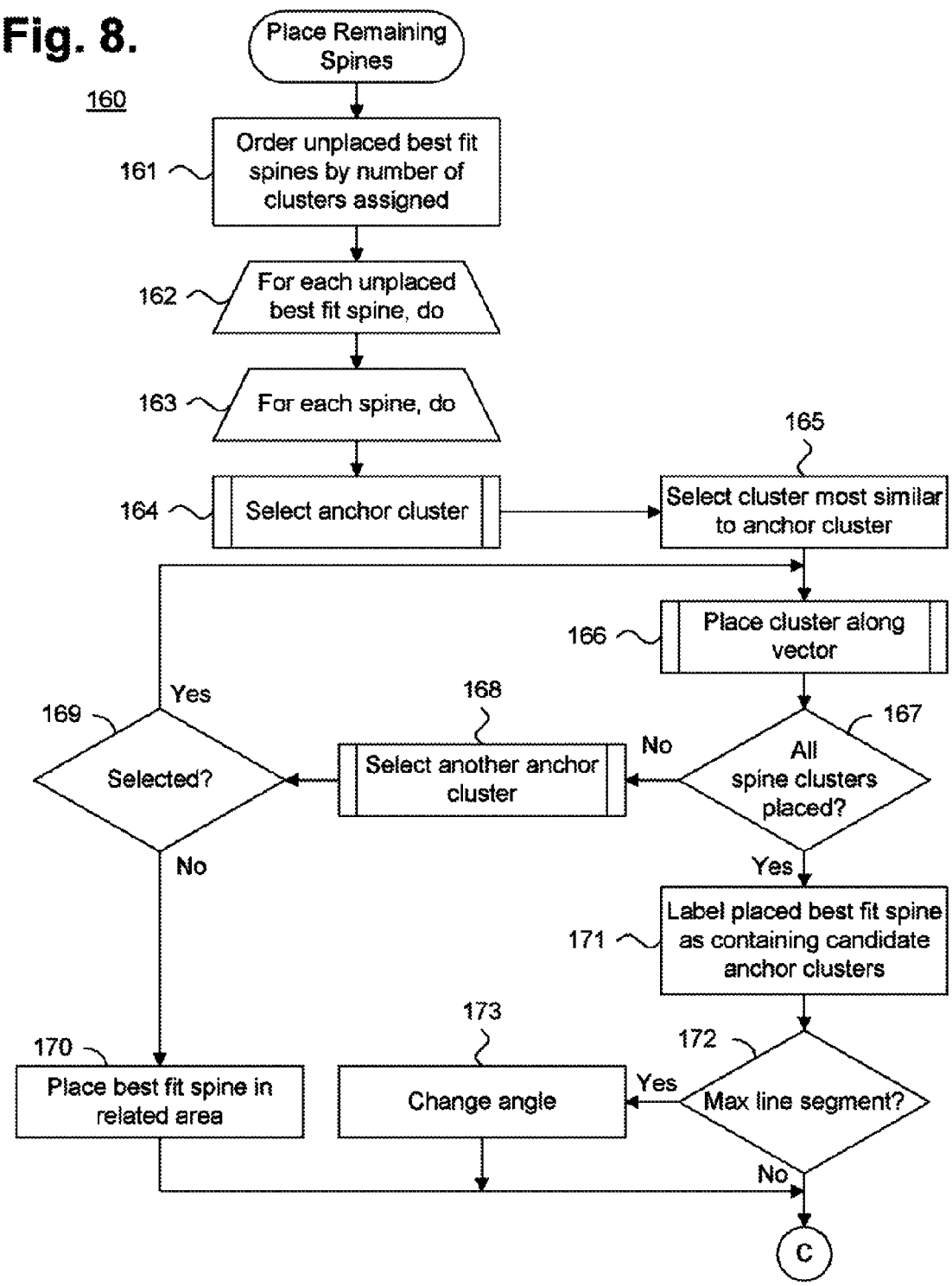
FIG. 8 is a flow diagram showing the routine for placing remaining best fit spines for use in the method of FIG. 3.
Figure 8:
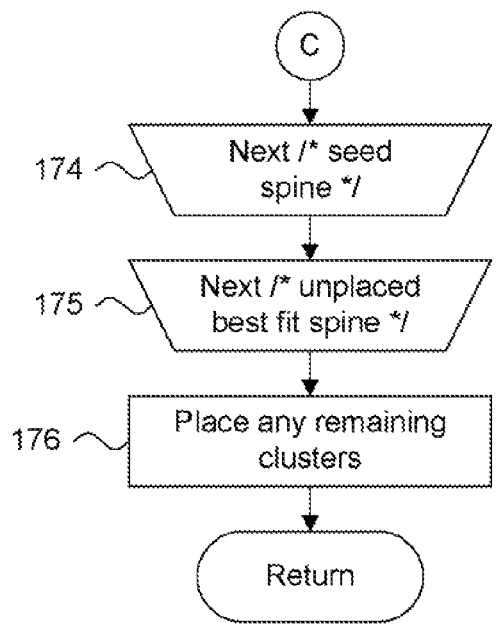

FIG. 8 is a flow diagram showing the routine 160 for placing remaining candidate spines 55 for use in the method 100 of FIG. 3. One purpose of this routine identify and place any remaining unplaced best fit spines 56 and clusters 50 that lack best fit spines 56 into the visualization 43.

First, any remaining unplaced best fit spines 56 are ordered by number of clusters 50 assigned (block 161). The unplaced best fit spine 56 are iteratively processed (blocks 162-175) against each of the previously-placed spines (blocks 163-174). During each iteration, an anchor cluster 60 is selected from the previously placed spine 58 (block 164), as further described below with reference to FIG. 9. The cluster 50 contained in the best fit spine 56 that is most similar to the selected anchor cluster 60 is then selected (block 165). In the described embodiment, cluster similarity is calculated as cosine value of the cumulative cluster concept vectors 51, although other determinations of cluster similarity are possible, including minimum, maximum, and median similarity bounds. The spine clusters 50 are grafted onto the previously placed spine along a vector defined from the center of the anchor cluster 55 (block 166), as further described below with reference to FIG. 12. If any of the spine clusters are not placed (block 167), another anchor cluster 60 is selected (block 168), as further described below with reference to FIG. 9. Assuming another anchor cluster 60 is selected (block 169), the spine clusters are again placed (block 166), as further described below with reference to FIG. 12. Otherwise, if another anchor cluster 60 is not selected (block 169), the cluster 50 is placed in a related area (block 170). In one embodiment, unanchored best fit spines 56 become additional spine group seeds. In a further embodiment, unanchored best fit spines 56 can be placed adjacent to the best fit anchor cluster 60 or in a display area of the visualization 43 separately from the placed best fit spines 56.

If the cluster 50 is placed (block 167), the best fit spine 56 is labeled as containing candidate anchor clusters 60 (block 171). If the current vector forms a maximum line segment (block 172), the angle of the vector is changed (block 173). In the described embodiment, a maximum line segment contains more than 25 clusters 50, although any other limit could also be applied. Processing continues with each seed spine (block 174) and remaining unplaced best fit spine 56 (block 175). Finally, any remaining unplaced clusters 50 are placed (block 176). In one embodiment, unplaced clusters 50 can be placed adjacent to a best fit anchor cluster 60 or in a display area of the visualization 43 separately from the placed best fit spines 56. The routine then returns.

Anchor Cluster Selection

Figure 9:
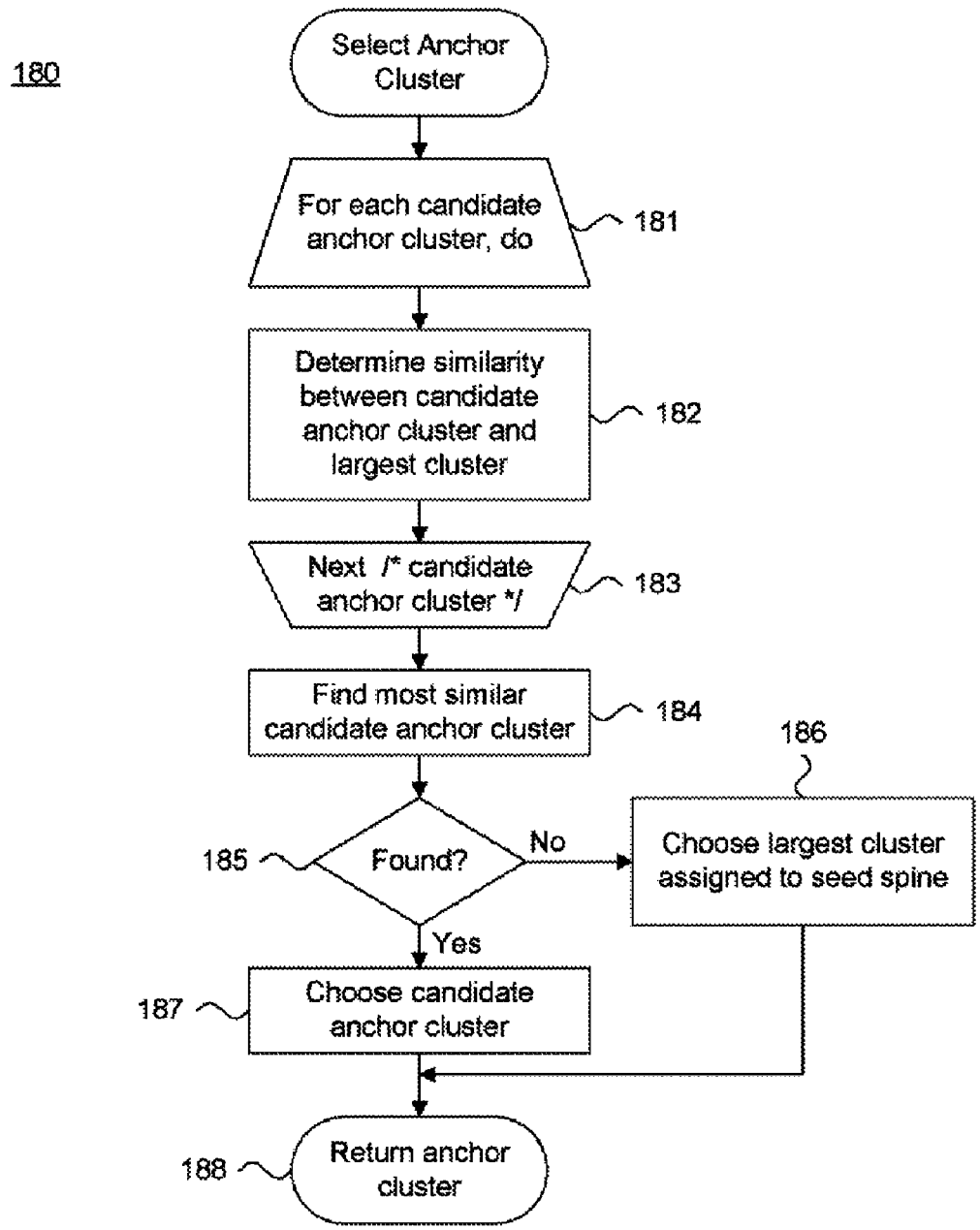
FIG. 9 is a flow diagram showing the function for selecting an anchor cluster for use in the routine of FIG. 8.

FIG. 9 is a flow diagram showing the function 180 for selecting an anchor cluster 60 for use in the routine 160 of FIG. 8. One purpose of this routine is to return a set of anchor clusters 60, which contain the spine concept and which are ordered by similarity to the largest cluster 50 in the spine.

Each candidate anchor cluster 60 is iteratively processed (blocks 181-183) to determine the similarity between a given cluster 50 and each candidate anchor cluster 60 (block 182). In one embodiment, each cluster similarity is calculated as cosine value concept vectors, although other determinations of cluster similarity are possible, including minimum, maximum, and median similarity bounds. The most similar candidate anchor cluster 60 is identified (block 184) and, if found, chosen as the anchor cluster 60 (block 187), such as described in commonly-assigned U.S. Pat. No. 7,271,801, issued Sep. 18, 2007, the disclosure of which is incorporated by reference. Otherwise, if not found (block 185), the largest cluster 50 assigned to the unique seed spine 58 is chosen as the anchor cluster 60 (block 186). The function then returns set of the anchor clusters 60 and the unique seed spine 58 becomes a seed for a new spine group (block 188).

Cluster Spine Example

Figure 10:
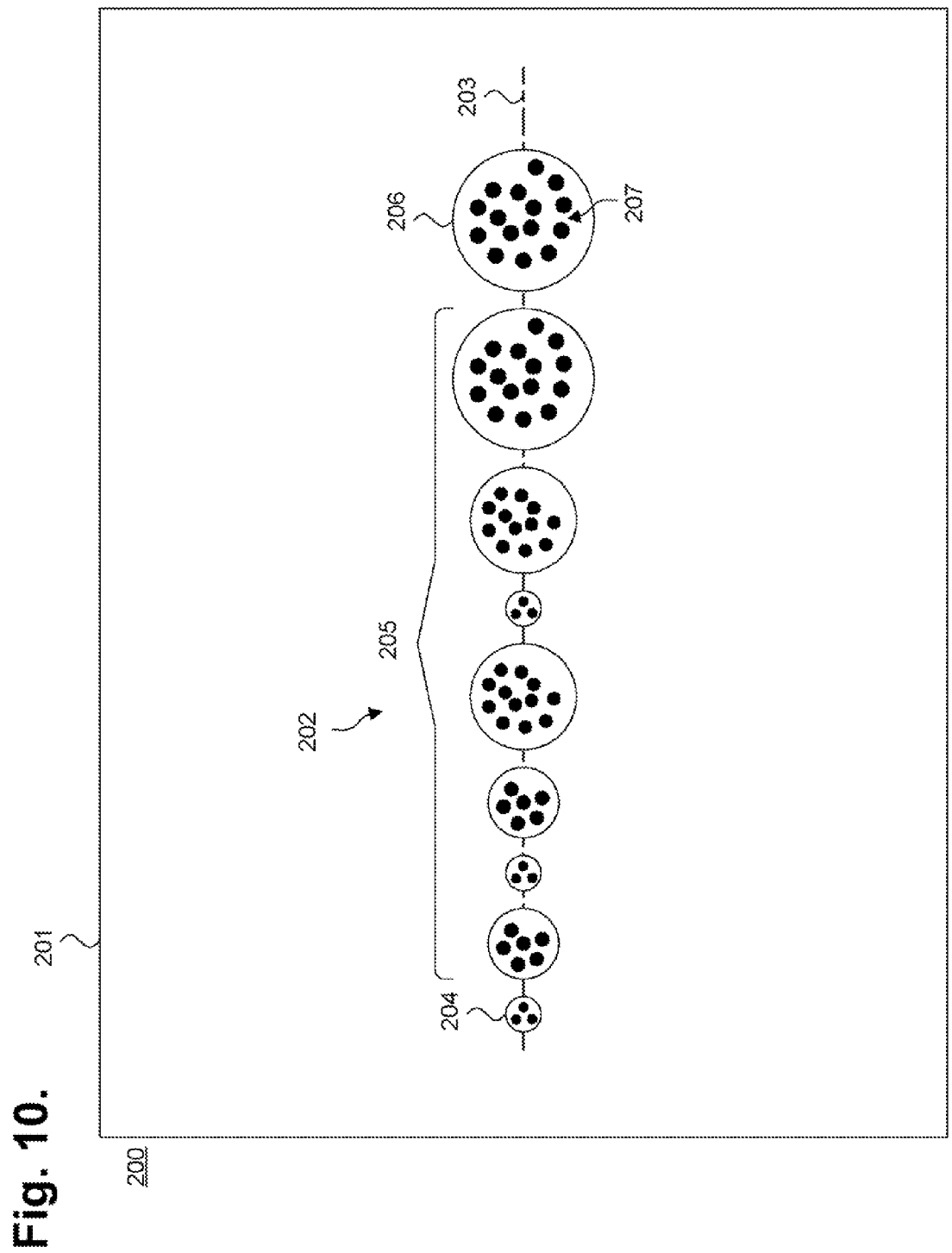
FIG. 10 is a data representation diagram showing, by way of example, a view of a cluster spine.

FIG. 10 is a data representation diagram 200 showing, by way of example, a view of a cluster spine 202. Clusters are placed in a cluster spine 202 along a vector 203, preferably defined from center of an anchor cluster. Each cluster in the cluster spine 202, such as endpoint clusters 204 and 206 and midpoint clusters 205, group documents 207 sharing a popular concept, that is, assigned to a best-fit concept 53. The cluster spine 202 is placed into a visual display area 201 to generate a two-dimensional spatial arrangement. To represent data inter-relatedness, the clusters 204-206 in each cluster spine 202 are placed along a vector 203 arranged in order of cluster similarity, although other line shapes and cluster orderings can be used.

The cluster spine 202 visually associates those clusters 204-206 sharing a common popular concept. A theme combines two or more concepts. During cluster spine creation, those clusters 204-206 having available anchor points are identified for use in grafting other cluster spines sharing popular thematically-related concepts, as further described below with reference to FIGS. 11A-C.

Anchor Points Example

Figure 11A:
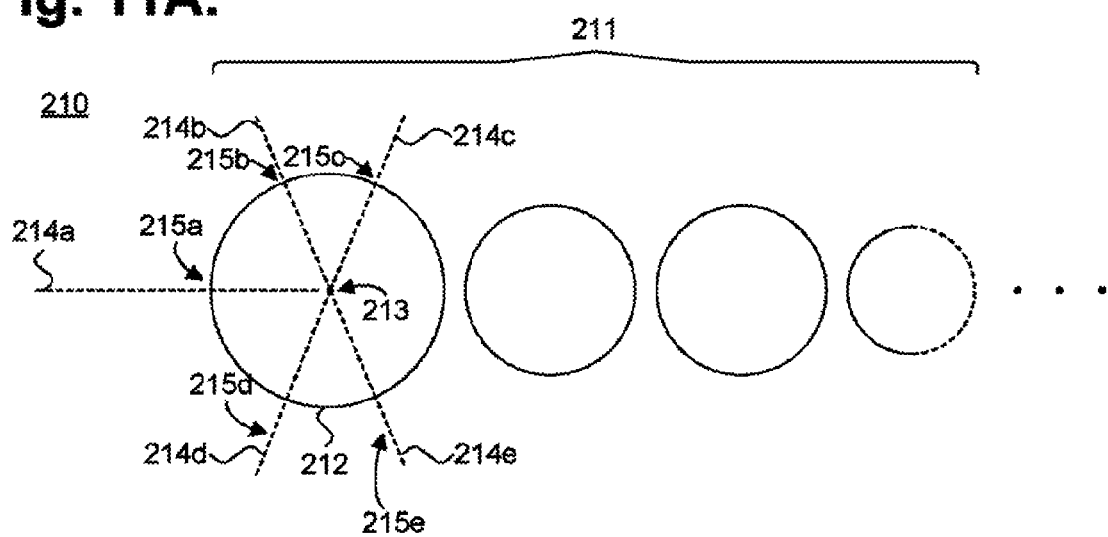
FIGS. 11A-C are data representation diagrams showing anchor points within cluster spines.
Figure 11B:
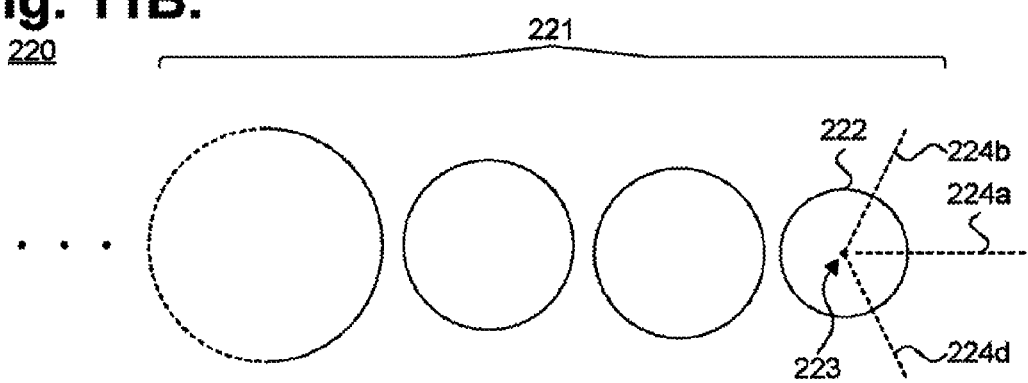
Figure 11C:
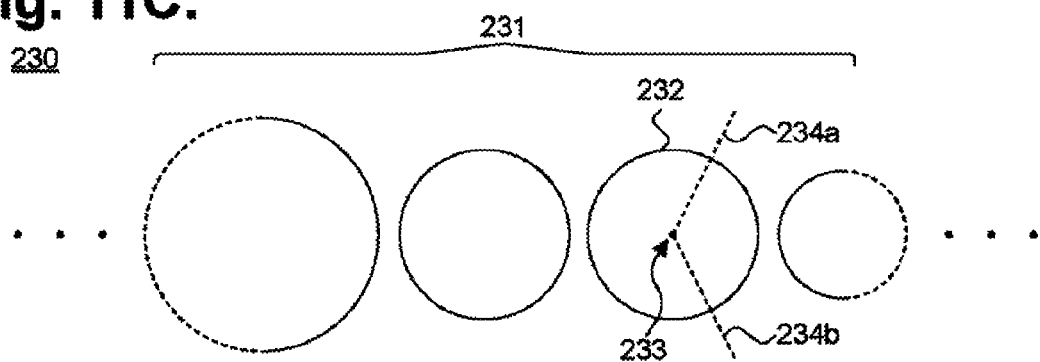

FIGS. 11A-C are data representation diagrams 210, 220, 230 showing anchor points within cluster spines. A placed cluster having at least one open edge constitutes a candidate anchor point 54. Referring first to FIG. 11A, a starting endpoint cluster 212 of a cluster spine 211 functions as an anchor point along each open edge 215a-e at primary and secondary angles.

An open edge is a point along the edge of a cluster at which another cluster can be adjacently placed. In the described embodiment, clusters are placed with a slight gap between each cluster to avoid overlapping clusters. Otherwise, a slight overlap within 10% with other clusters is allowed. An open edge is formed by projecting vectors 214a-e outward from the center 213 of the endpoint cluster 212, preferably at normalized angles. The clusters in the cluster spine 211 are arranged in order of cluster similarity.

In one embodiment, given $0 \leq \sigma < \Pi$, where $\sigma$ is the angle of the current cluster spine 211, the normalized angles for largest endpoint clusters are at one third $\Pi$ to minimize interference with other spines while maximizing the degree of interrelatedness between spines. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used.

Referring next to FIG. 11B, the last endpoint cluster 222 of a cluster spine 221 also functions as an anchor point along each open edge. The endpoint cluster 222 contains the fewest number of concepts. The clusters in the cluster spine 221 are arranged in order of similarity to the last placed cluster. An open edge is formed by projecting vectors 224a-c outward from the center 223 of the endpoint cluster 222, preferably at normalized angles.

In one embodiment, given $0 \leq \sigma < \Pi$, where $\sigma$ is the angle of the current cluster spine 221, the normalized angles for smallest endpoint clusters are at one third $\Pi$, but only three open edges are available to graft other thematically-related cluster spines. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used.

Referring finally to FIG. 11C, a midpoint cluster 237 of a cluster spine 231 functions as an anchor point for a cluster spine 236 along each open edge. The midpoint cluster 237 is located intermediate to the clusters in the cluster spine 236 and defines an anchor point along each open edge. An open edge is formed by projecting vectors 239a-b outward from the center 238 of the midpoint cluster 237, preferably at normalized angles. Unlike endpoint clusters 52, 232 the midpoint cluster 237 can only serve as an anchor point along tangential vectors non-coincident to the vector forming the cluster spine 236. Accordingly, endpoint clusters 212, 222 include one additional open edge serving as a coincident anchor point.

In one embodiment, given $0 \leq \sigma < \Pi$, where $\sigma$ is the angle of the current cluster spine 231, the normalized angles for midpoint clusters are at one third $\Pi$, but only two open edges are available to graft other thematically-related cluster spines. Empirically, limiting the number of available open edges to those facing the direction of cluster similarity helps to maximize the interrelatedness of the overall display space.

Grafting a Spine Cluster Onto a Spine

Figure 12:
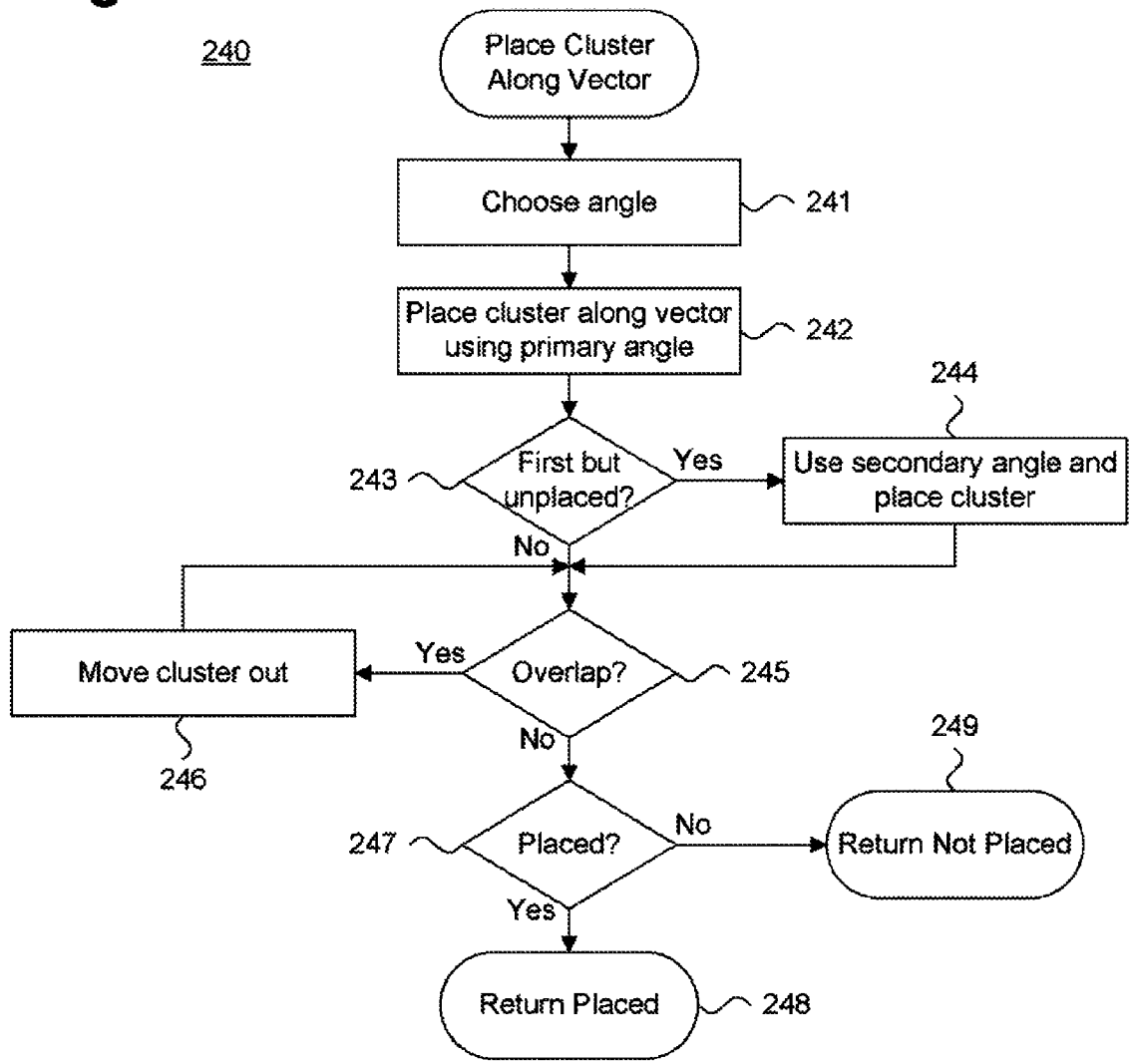
FIG. 12 is a flow diagram showing the function for grafting a spine cluster onto a spine for use in the routine of FIG. 8.

FIG. 12 is a flow diagram showing the function 240 for grafting a spine cluster 50 onto a spine for use in the routine 160 of FIG. 8. One purpose of this routine is to attempt to place a cluster 50 at an anchor point in a cluster spine either along or near an existing vector, if possible, as further described below with reference to FIG. 13.

An angle for placing the cluster 50 is determined (block 241), dependent upon whether the cluster against which the current cluster 50 is being placed is a starting endpoint, midpoint, or last endpoint cluster, as described above with reference to FIGS. 11A-C. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used. The cluster 50 is then placed using the primary angle (block 242). If the cluster 50 is the first cluster in a cluster spine but cannot be placed using the primary angle (block 243), the secondary angle is used and the cluster 50 is placed (block 244). Otherwise, if the cluster 50 is placed but overlaps more than 10% with existing clusters (block 245), the cluster 50 is moved outward (block 246) by the diameter of the cluster 50. Finally, if the cluster 50 is satisfactorily placed (block 247), the function returns an indication that the cluster 50 was placed (block 248). Otherwise, the function returns an indication that the cluster was not placed (block 249).

Cluster Placement Relative to an Anchor Point Example

Figure 13:
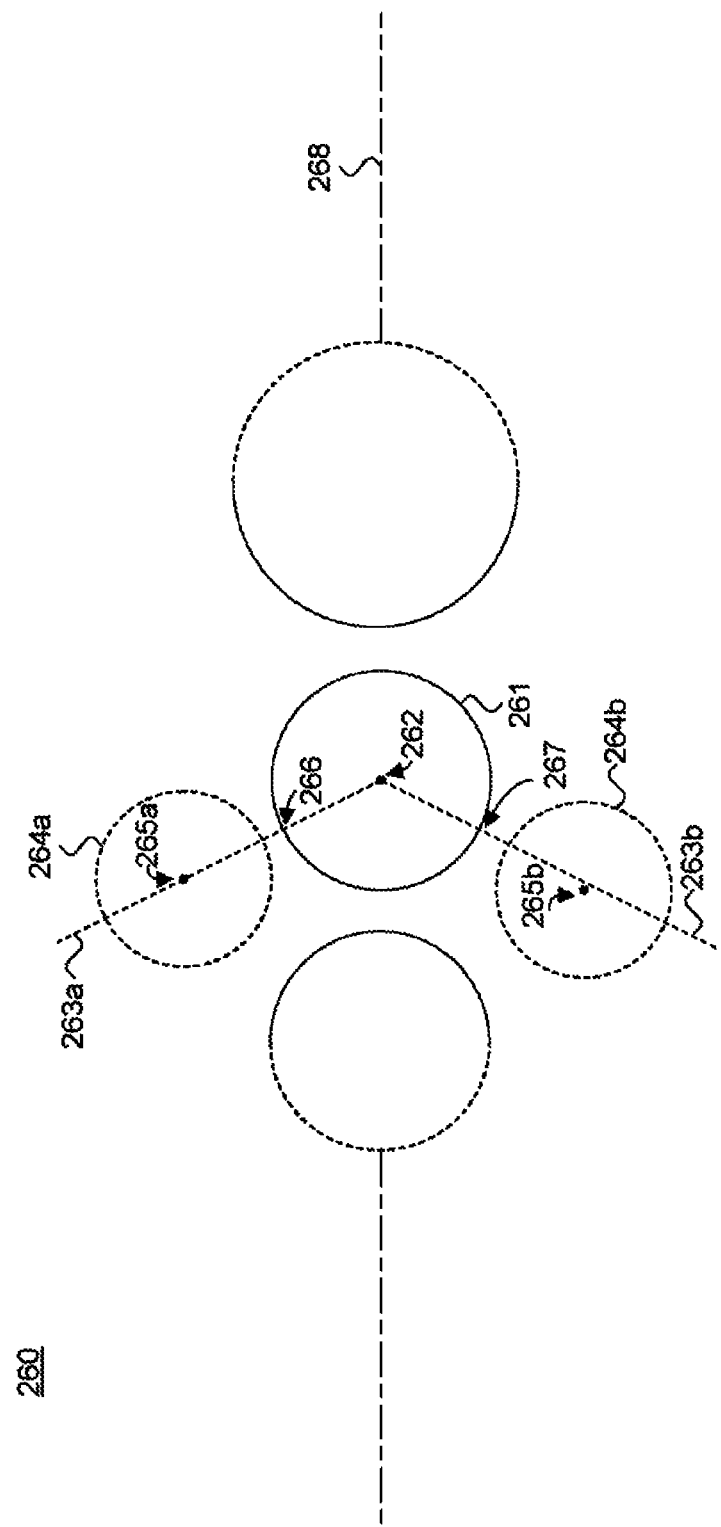
FIG. 13 is a data representation diagram showing, by way of example, cluster placement relative to an anchor point.

FIG. 13 is a data representation diagram showing, by way of example, cluster placement relative to an anchor point. Anchor points 266, 267 are formed along an open edge at the intersection of a vector 263a, 263b, respectively, drawn from the center 262 of the cluster 261. The vectors are preferably drawn at a normalized angle, such as $$\frac{\pi}{3}$$

in one embodiment, relative to the vector 268 forming the cluster spine 268.

Completed Cluster Placement Example

Figure 14:
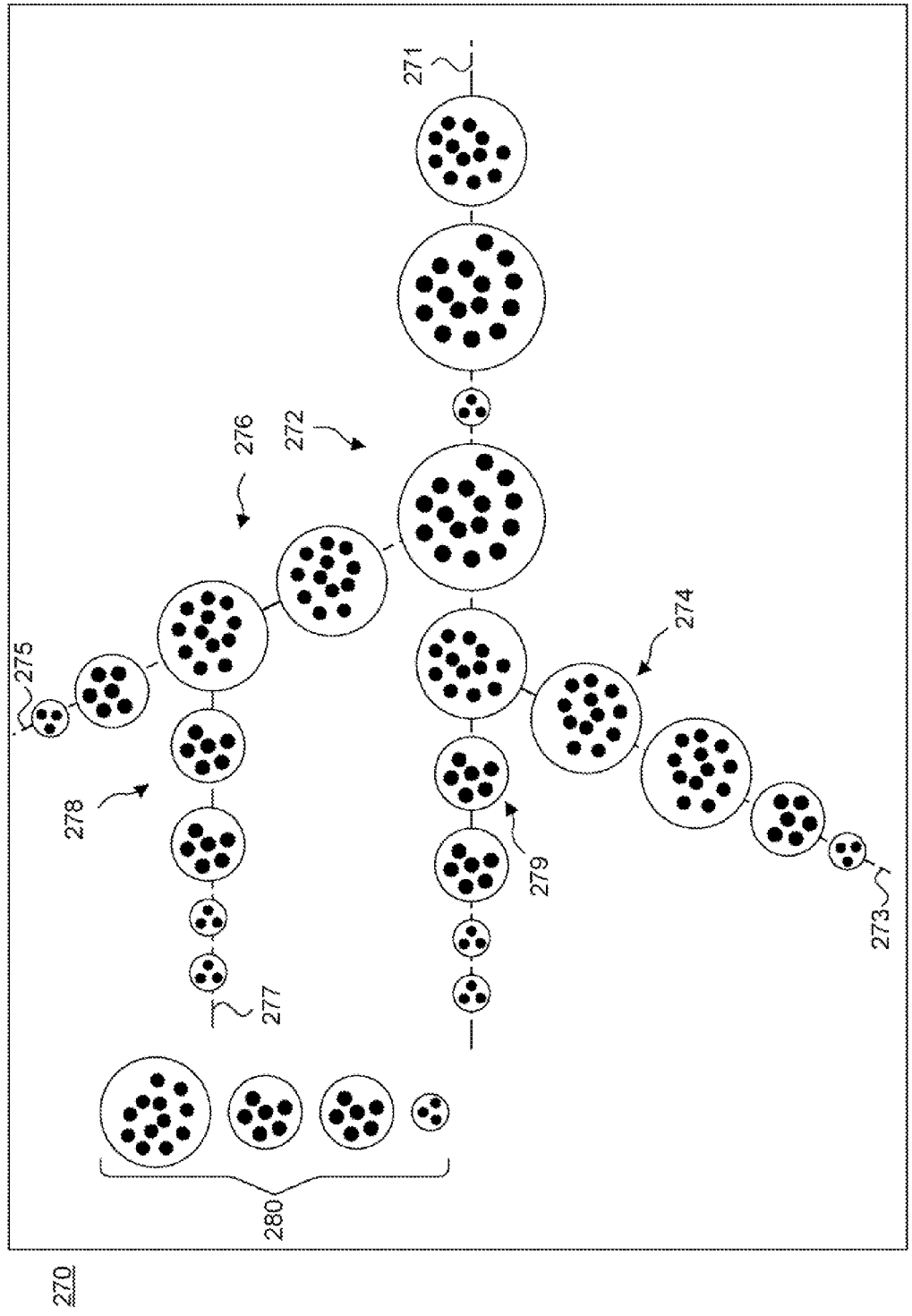
FIG. 14 is a data representation diagram showing, by way of example, a completed cluster placement.

FIG. 14 is a data representation diagram 270 showing, by way of example, a completed cluster placement. The clusters 272, 274, 276, 278 placed in each of the cluster spines 271, 273, 275, 277 are respectively matched to popular concepts, that is, best-fit concepts 53. Slight overlap 279 between grafted clusters is allowed. In one embodiment, no more than 10% of a cluster can be covered by overlap. The singleton clusters 280, however, do not thematically relate to the placed clusters 272, 274, 276, 278 in cluster spines 271, 273, 275, 277 and are therefore grouped as individual clusters in non-relational placements.

Display Generator

Figure 15:
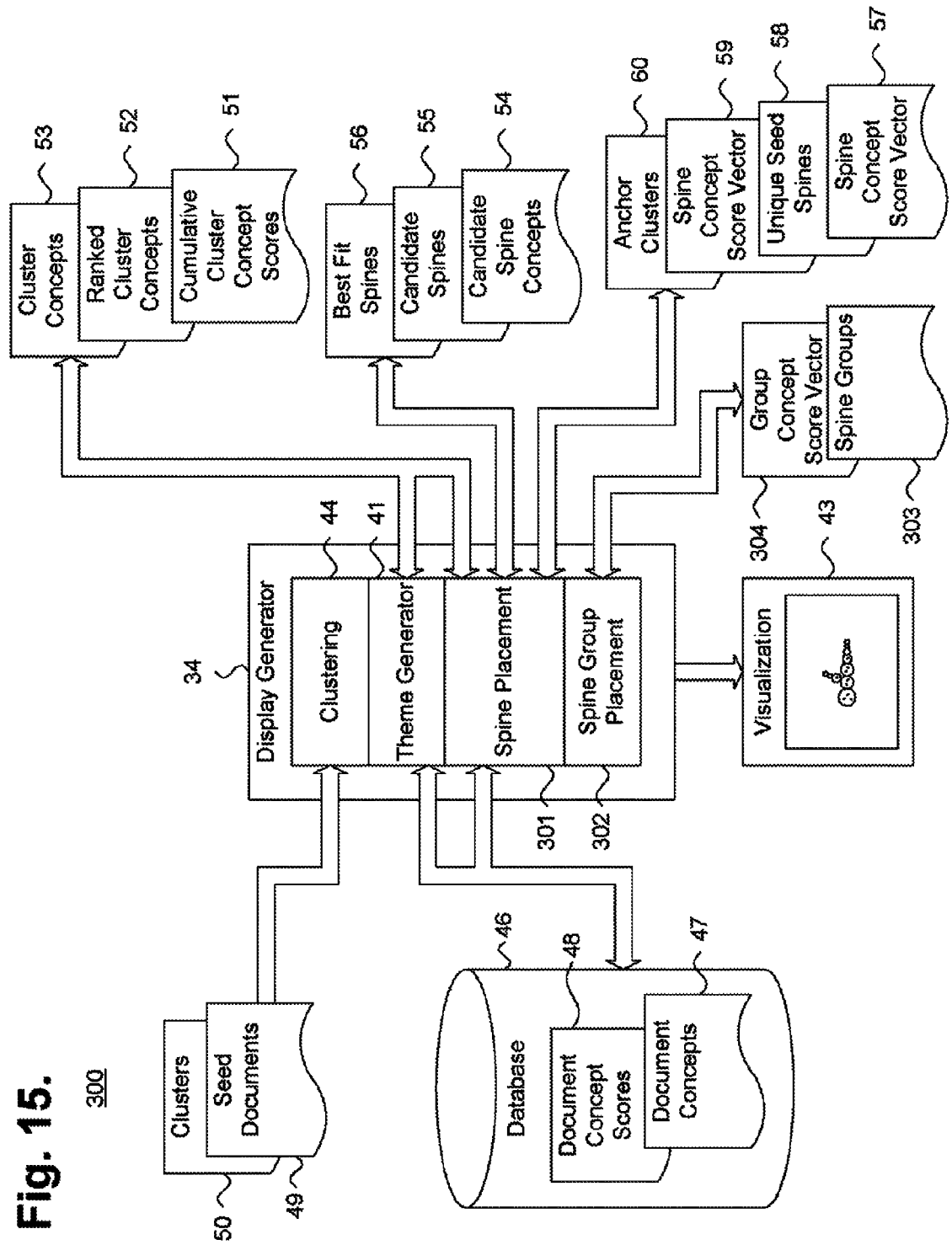
FIG. 15 is a block diagram showing the system modules implementing the display generator of FIG. 1, in accordance with a further embodiment.

FIG. 15 is a block diagram 300 showing the system modules implementing the display generator 34 of FIG. 1, in accordance with a further embodiment. The display generator 34 includes the clustering 44 and theme generator 41 components and maintains the attached storage 44 and the database 46, as further described above with reference to FIG. 2. In addition, the display generator 34 includes spine placement 301 and spine group placement 302 components that respectively place best fit cluster spines 56 and singleton clusters 50 into spine groups 303 and places the spine groups 303 into a two-dimensional display space as a visualization 43.

Briefly, the cluster placement component 301 performs five principal functions. First, the cluster placement component 42 selects candidate spines 55, as further described above with reference to FIG. 5. Briefly, the candidate spines 55 are selected by surveying the cluster concepts 53 for each cluster 50. Each cluster concept 53 shared by two or more clusters 50 can potentially form a spine of clusters 50. However, those cluster concepts 53 referenced by just a single cluster 50 or by more than 10% of the clusters 50 are discarded. The remaining clusters 50 are identified as candidate spine concepts 54, which each logically form a candidate spine 55.

Second, the cluster placement component 42 assigns each of the clusters 50 to a best fit spine 56, as further described above with reference to FIG. 6. Briefly, the fit of each candidate spine 55 to a cluster 50 is determined by evaluating the candidate spine concept 54 to the cluster concept 53. The candidate spine 545 exhibiting a maximum fit is selected as the best fit spine 56 for the cluster 50.

Third, the cluster placement component 42 selects and places unique seed spines 58, as further described above with reference to FIG. 7. Briefly, the best fit spines 56 are first ordered based on spine length using, for instance, the number of clusters 50 contained in the spine. Thus, longer best fit spines are selected first. Spine concept score vectors 57 are then generated for each best fit spine 56 and evaluated. Those best fit spines 56 having an adequate number of assigned clusters 50 and which are sufficiently dissimilar to any previously selected best fit spines 56 are designated and placed as seed spines 58.

Fourth, the cluster placement component 42 places any remaining unplaced best fit spines 56 are placed into spine groups 303, as further described below with reference to FIG. 18. Briefly, a list of anchor cluster candidates 60 is built by identifying those placed best fit spines 56 that contain a potential anchor cluster containing the theme of the unplaced best fit spine 56, have at least one open edge for grafting a spine, and which have at least a minimum similarity. In the described embodiment, spine similarity is determined by evaluating the cosine values of group concept score vectors 304 for the unplaced and placed best fit spines 56 and a minimum similarity of 0.10 is required, although other similarity values are possible. Spine groups 303 are formed by placing the unplaced best fit spines 56 at an anchor cluster 60 on the previously placed best fit spine 56 having the most similarity along a vector originating at the anchor cluster 60. As necessary, best fit spines 56 are placed outward or in a new vector at a different angle from new anchor clusters 60.

Finally, any remaining singleton clusters 50 are placed into spine groups 303, as further described below with reference to FIG. 19. Briefly, a list of candidate anchor clusters 60 is built by identifying those placed best fit spines 56 that have at least one open edge for grafting a spine. Placement is based on a weaker connection and is represented by the proximity of the singleton cluster 50 to a placed best fit spine 56, as further described below with reference to FIG. 19. Thus, if possible, the remaining singleton clusters 50 are placed near an anchor cluster 60 having the most similarity.

The cluster spine group placement component 302 places the spine groups 303 within the visualization 43, as further described below with reference to FIG. 20. Briefly, the spine groups 303 are arranged circumferentially to a central shape defined logically within the visualization 43. In the described embodiment, a circle is defined within the visualization 43 and the spine groups 303 are placed radially within equally-sized sectors specified along the circumference of the circle, as further described below with reference to FIG. 21. As necessary, the spine groups 303 are placed outward to avoid overlap.

Method Overview

Figure 16:
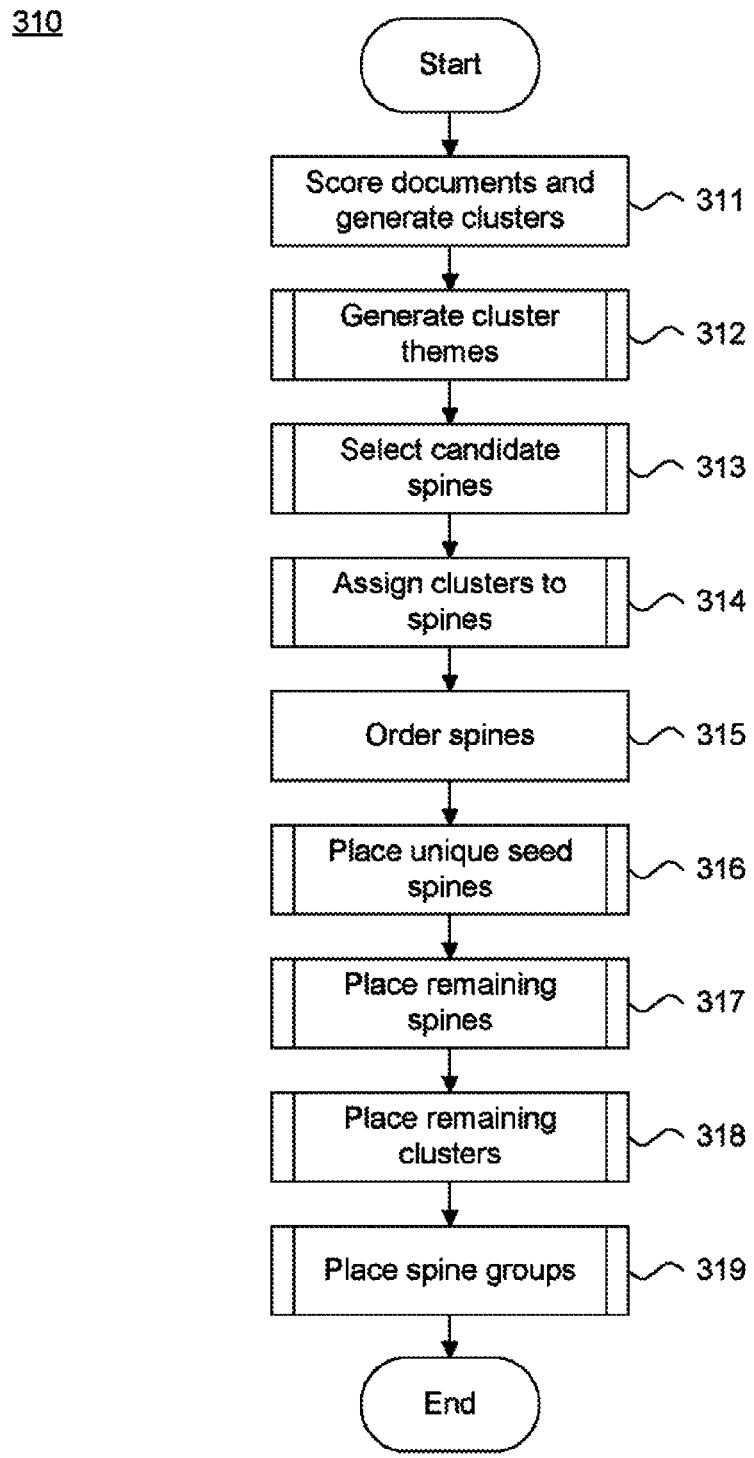
FIG. 16 is a flow diagram showing a method for arranging concept clusters in thematic neighborhood relationships in a shaped two-dimensional visual display space, in accordance with a further embodiment.

FIG. 16 is a flow diagram showing a method 310 for arranging concept clusters in thematic neighborhood relationships in a shaped two-dimensional visual display space 43, in accordance with a further embodiment. The method 310 is described as a sequence of process operations or steps, which can be executed, for instance, by a display generator 32 (shown in FIG. 1).

As an initial step, documents 14 are scored and clusters 50 are generated (block 311), such as described in commonly-assigned U.S. Pat. No. 7,610,313, issued Oct. 27, 2009, the disclosure of which is incorporated by reference. Next, one or more cluster concepts 53, that is, "themes," are generated for each cluster 50 based on cumulative cluster concept scores 51 (block 312), as further described above with reference to FIG. 4. The cluster concepts 53 are used to select candidate spines 55 (block 313), as further described above with reference to FIG. 5, and the clusters 50 are then assigned to the candidate spines 55 as best fit spines 56 (block 314), as further described above with reference to FIG. 6.

Spine groups 303 are then formed and placed within the visualization 43 in the display space, as follows. First, the best fit spines 56 are ordered based on spine length using, for instance, the number of clusters 50 contained in the spine (block 315). Thus, longer best fit spines 56 are selected first. Other orderings of the best fit spines 56 are possible. Unique seed spines are identified from the ordered best fit spines 56 and placed to create best fit spines (block 316), as further described above with reference to FIG. 7. Any remaining unplaced non-seed best fit spines 56 are identified and placed with the placed seed best fit spines 56 (block 317), as further described below with reference to FIG. 18. Similarly, any remaining unplaced singleton clusters 50 are identified and placed as loose "grafts" to the placed best fit spines 56 (block 317), as further described below with reference to FIG. 19. Finally, the spine groups 303, which include the placed best fit spines 56 and the loosely grafted singleton clusters 50, are placed within the visualization 43 (block 319), as further described below with reference to FIG. 21. In the described embodiment, each of the spine groups is placed in a radial layout circumferential to a logically defined circle so as to avoid overlap with other spine groups. The radial layout facilitates improved user interface features through increased cluster spine group density and provides a cluster spine group placement allowing improved descriptive labeling. Other cluster, spine, and spine group placement methodologies could also be applied based on similarity, dissimilarity, attraction, repulsion, and other properties in various combinations, as would be appreciated by one skilled in the art. The method then terminates.

Cluster Assignment

Figure 17:
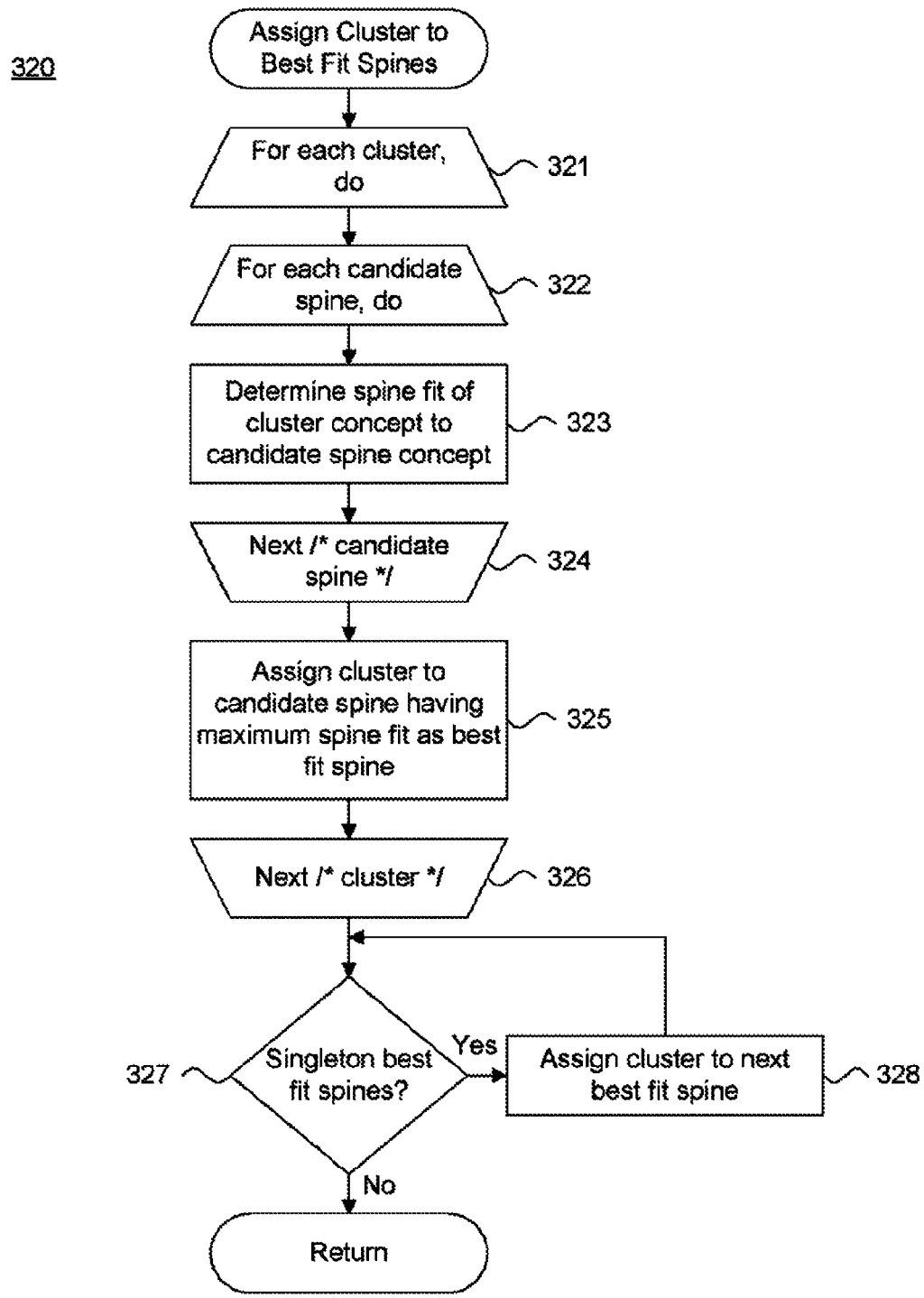
FIG. 17 is a flow diagram showing the routine for assigning clusters to best fit candidate spines for use in the method of FIG. 16.

FIG. 17 is a flow diagram showing the routine 320 for assigning clusters 50 to best fit candidate spines 56 for use in the method 310 of FIG. 16. One purpose of this routine is to match each cluster 50 to a best fit candidate spine 56.

The best fit spines 56 are evaluated by iteratively processing through each cluster 50 and candidate spine 55 (blocks 321-326 and 322-324, respectively). During each iteration for a given cluster 50 (block 321), the spine fit of a cluster concept 53 to a candidate spine concept 54 is determined (block 323) for a given candidate spine 55 (block 322). In the described embodiment, the spine fit F is calculated according to the following equation:

$$F = \log\left(\frac{v}{r^2}\right) \times w$$

where v is defined as the number of clusters 50 containing the candidate spine concept 54 as a cluster concept 53, v is defined as the rank order of the cluster concept 53, and w is defined as bias factor. In the described embodiment, a bias factor of 5.0 is used for user-specified concepts, while a bias factor of 1.0 is used for all other concepts. Processing continues with the next candidate spine 55 (block 324). Next, the cluster 50 is assigned to the candidate spine 55 having a maximum spine fit as a best fit spine 56 (block 325). Processing continues with the next cluster 50 (block 326). Finally, any best fit spine 56 that attracts only a single cluster 50 is discarded (block 327) by assigning the cluster 50 to a next best fit spine 56 (block 328). The routine returns.

In a further embodiment, each cluster 50 can be matched to a best fit candidate spine 56 as further described above with reference to FIG. 6.

Remaining Cluster Spine Placement

Figure 18:
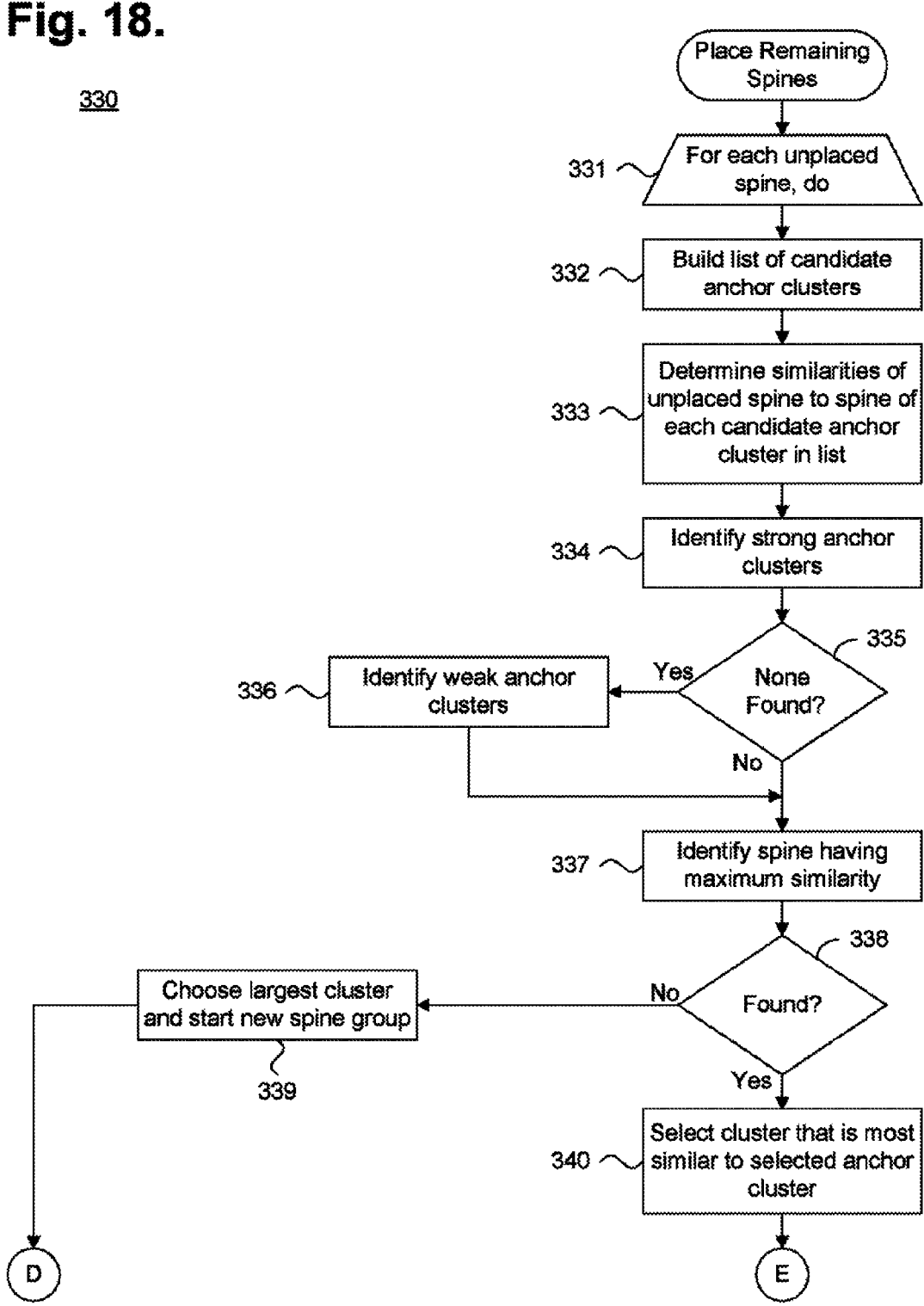
FIG. 18 is a flow diagram showing the routine for placing remaining cluster spines for use in the method of FIG. 16.
Figure 18:
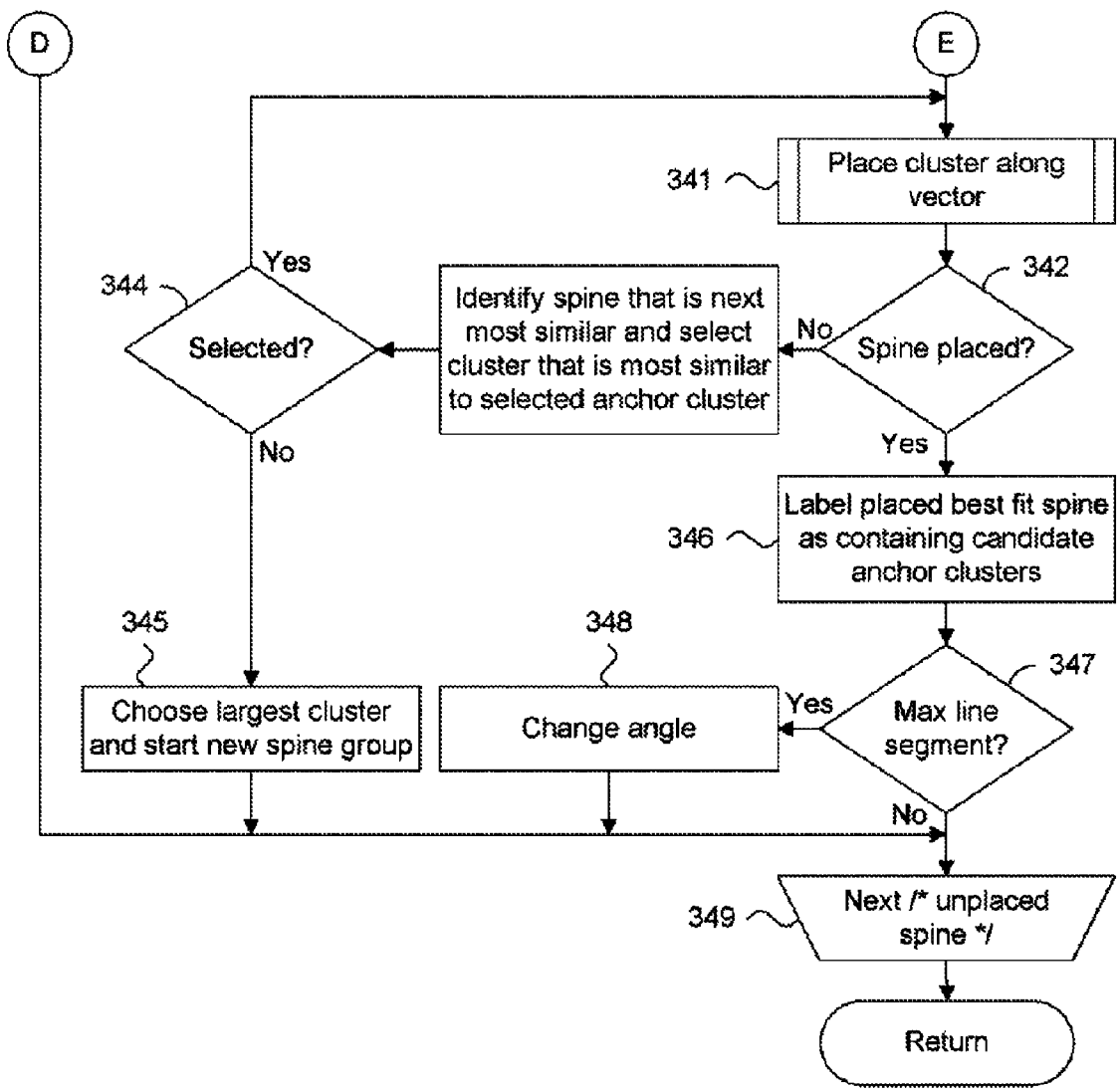

FIG. 18 is a flow diagram showing the routine 330 for placing remaining cluster spines 56 for use in the method 310 of FIG. 16. The remaining cluster spines 56 are those cluster spines that are non-seed best fit spines 56. The purpose of the routine is to graft each remaining cluster spine 56 onto an already-placed seed best fit spine 56 having the closest similarity with a connecting line drawn in the visualization 43 to indicate relatedness.

Each of the remaining unplaced cluster spines 56 is iteratively processed (blocks 331-349), as follows. For each unplaced cluster spine 56 (block 331), a list of candidate anchor clusters 60 is first built from the set of placed seed best fit spines 56 (block 332). In the described embodiment, a candidate anchor cluster 60 has been placed in a best fit spine 56, has at least one open edge for grafting a cluster spine 56, and belongs to a best fit spine 56 that has a minimum similarity of 0.1 with the unplaced cluster spine 56, although other minimum similarity values are possible. The similarities between the unplaced cluster spine 56 and the best fit spine of each candidate anchor cluster 60 in the list are determined (block 333). The similarities can be determined by taking cosine values over a set of group concept score vector 304 formed by aggregating the concept scores for all clusters 56 in the unplaced cluster spine 56 and in the best fit spine of each candidate anchor cluster 60 in the list. Strong candidate anchor clusters 60, which contain the same concept as the unplaced cluster spine 56, are identified (block 334). If no qualified placed anchor clusters 60 are found (block 335), weak candidate anchor clusters 60, which, like the strong candidate anchor clusters 60, are placed, have an open edge, and reflect the minimum best fit spine similarity, are identified (block 336).

Next, the unplaced cluster spine 56 is placed. During spine placement (blocks 338-348), the strong candidate anchor clusters 60 are selected before the weak candidate anchor clusters 60. The best fit spine 56 having a maximum similarity to the unplaced cluster spine 56 is identified (block 337). If a suitable best fit spine 56 is not found (block 338), the largest cluster 60 on the unplaced cluster spine 56 is selected and the unplaced cluster spine 56 becomes a new spine group 303 (block 339). Otherwise, if a best fit spine 56 is found (block 338), the cluster 60 on the unplaced cluster spine 56 that is most similar to the selected anchor cluster 60 is selected (block 340). The unplaced cluster spine 56 is placed by grafting onto the previously placed best fit spine 56 along a vector defined from the center of the anchor cluster 55 (block 341), as further described above with reference to FIG. 12. If any of the spine clusters are not placed (block 342), the best fit spine 56 having the next closest similarity to the unplaced cluster spine 56 is identified and the cluster on the unplaced cluster spine 56 that is most similar to the selected anchor cluster 60 is selected (block 343), as further described above with reference to FIG. 9. Assuming another anchor cluster 60 is selected (block 344), the unplaced cluster spine 56 is again placed (block 341), as further described above with reference to FIG. 12. Otherwise, if another anchor cluster 60 is not selected (block 344), the largest cluster 60 on the unplaced cluster spine 56 is selected and the unplaced cluster spine 56 becomes a new spine group 303 (block 345).

If the unplaced cluster spine 56 is placed (block 342), the now-placed best fit spine 56 is labeled as containing candidate anchor clusters 60 (block 346). If the current vector forms a maximum line segment (block 347), the angle of the vector is changed (block 348). In the described embodiment, a maximum line segment contains more than 25 clusters 50, although any other limit could also be applied. Processing continues with each remaining unplaced best fit spine 56 (block 349), after which the routine then returns.

Remaining Cluster Placement

Figure 19:
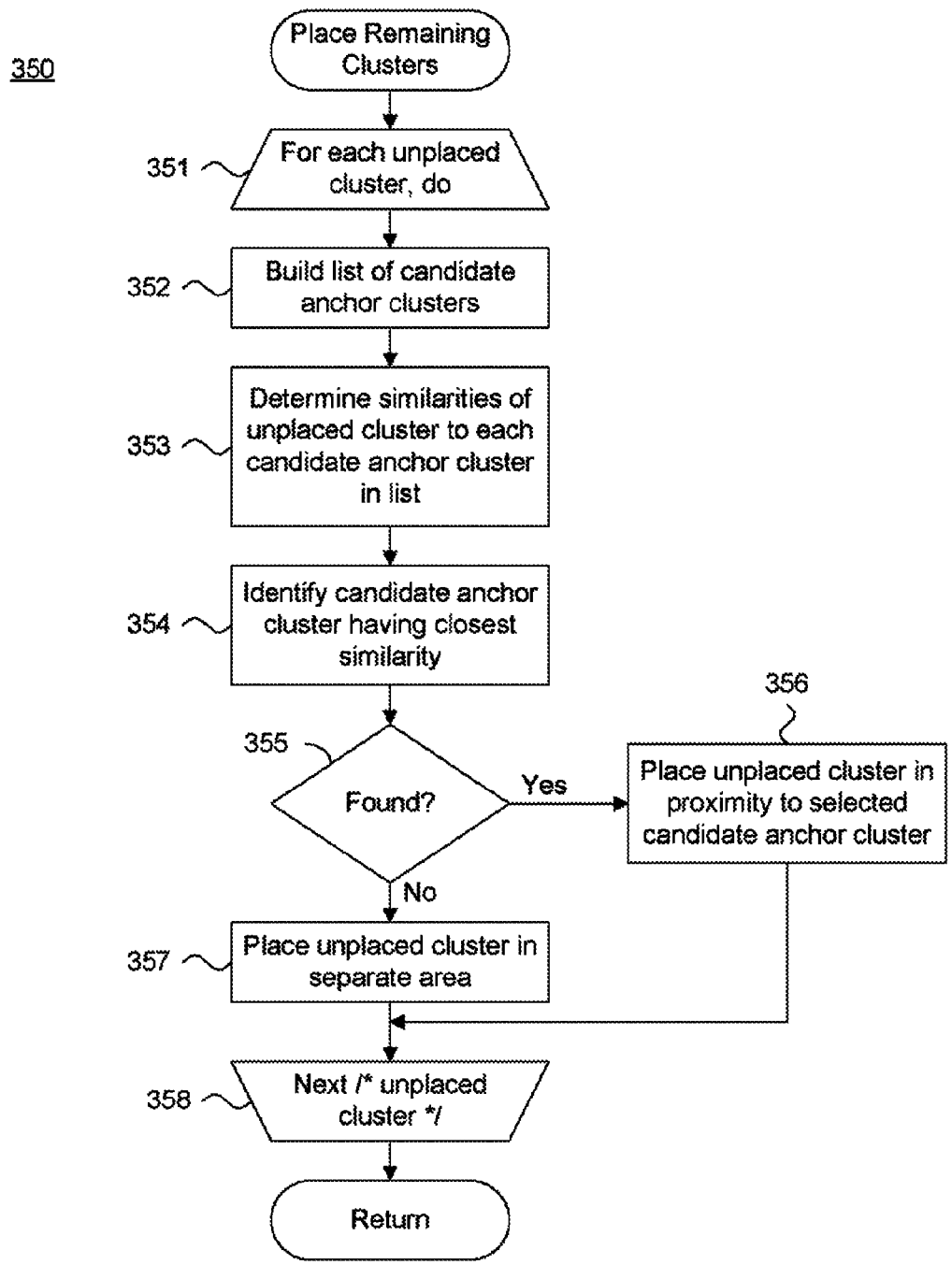
FIG. 19 is a flow diagram showing the routine for placing remaining clusters for use in the method of FIG. 16.

FIG. 19 is a flow diagram showing the routine 350 for placing remaining clusters 50 for use in the method 310 of FIG. 16. The remaining clusters 60 are those clusters that failed to share a sufficient similarity with a best fit spine 56. The purpose of the routine is to loosely graft each remaining cluster 60 in close proximity to an already-placed seed best fit spine 56 in a spine group 303. The placement is based on a weaker connection to the selected best fit spine 56 by proximity alone with no connecting line drawn in the visualization 43 to indicate relatedness.

Each of the remaining unplaced clusters 60 is iteratively processed (blocks 351-358), as follows. For each unplaced cluster 60, a list of candidate anchor clusters 60 is first built from the set of placed seed best fit spines 56 (block 352). In the described embodiment, a candidate anchor cluster 60 has at least one open edge for grafting a cluster 60. The similarities between the unplaced cluster 60 and each candidate anchor cluster 60 in the list are determined (block 353). The similarities can be determined by taking cosine values of the respective clusters 60. The candidate anchor cluster 60 having the closest similarity to the unplaced cluster 60 is identified (block 354). If a sufficiently similar candidate anchor cluster 60 found (block 355), the unplaced cluster 60 is placed in proximity to the selected candidate anchor cluster 60 (block 356). Otherwise, the unplaced cluster 60 are placed in a display area of the visualization 43 separately from the placed best fit spines 56 (block 357). Processing continues with each remaining unplaced cluster 60 (block 358), after which the routine then returns.

Example Cluster Spine Group

Figure 20:
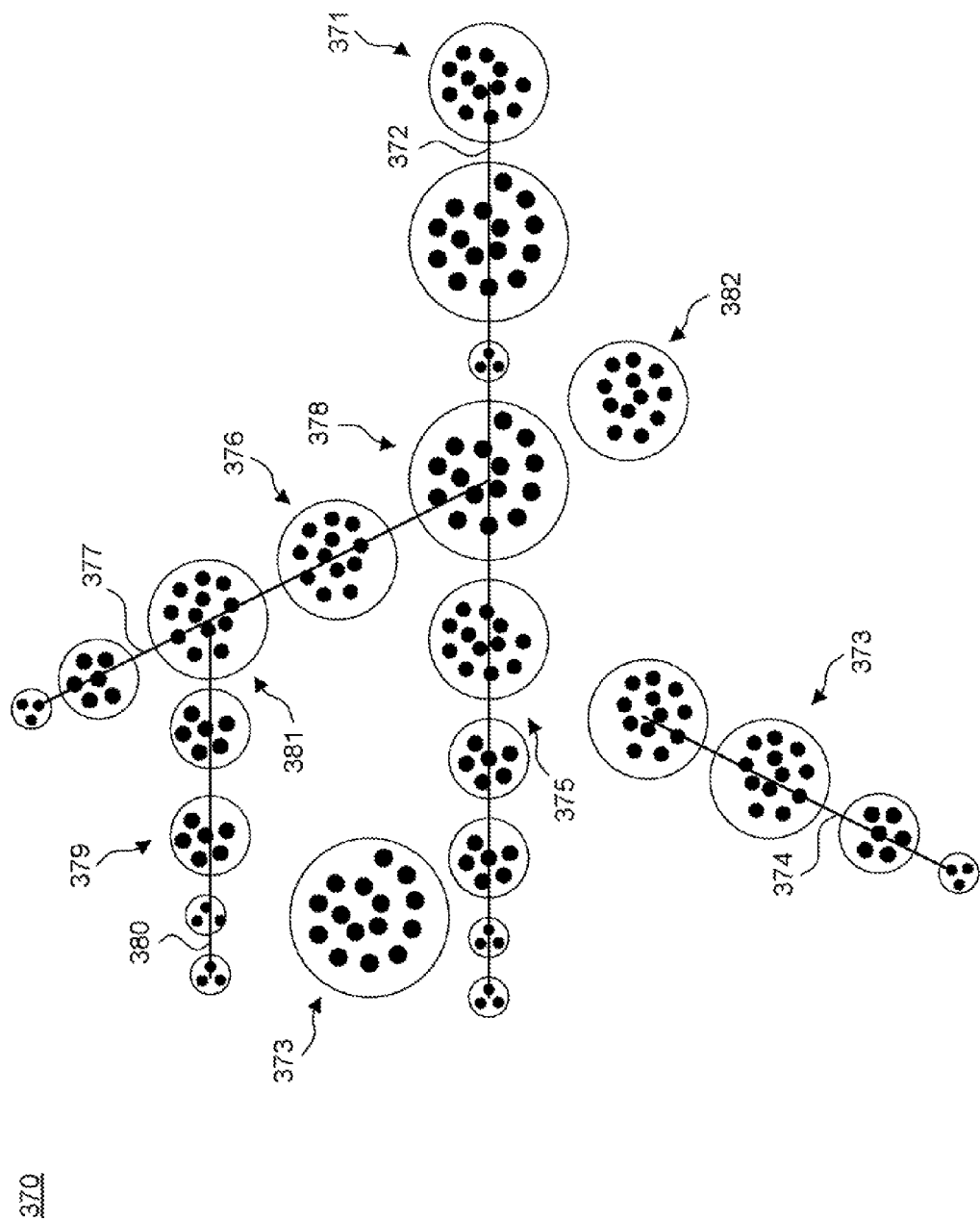
FIG. 20 is a data representation diagram showing, by way of example, a cluster spine group.

FIG. 20 is a data representation diagram showing, by way of example, a cluster spine group 370. A set of individual best fit spines 371, 373, 376, 379 are created by assigning clusters 50 sharing a common best fit theme. The best fit spines are ordered based on spine length and the longest best fit spine 371 is selected as an initial unique seed spine. Each of the unplaced remaining best fit spines 373, 376, 379 are grafted onto the placed best fit spine 371 by first building a candidate anchor cluster list. If possible, each remaining best fit spine 376, 379 is placed at an anchor cluster 378, 381 on the best fit spine that is the most similar to the unplaced best fit spine. The best fit spines 371, 376, 379 are placed along a vector 372, 377, 379 with a connecting line drawn in the visualization 43 to indicate relatedness. Otherwise, each remaining best fit spine 373 is placed at a weak anchor 375 with a connecting line 374 drawn in the visualization 43 to indicate relatedness. However, the connecting line 374 does not connect to the weak anchor 375. Relatedness is indicated by proximity only.

Next, each of the unplaced remaining singleton clusters 382 are loosely grafted onto a placed best fit spine 371, 376, 379 by first building a candidate anchor cluster list. Each of the remaining singleton clusters 382 are placed proximal to an anchor cluster 60 that is most similar to the singleton cluster. The singleton clusters 373, 382 are placed along a vector 372, 377, 379, but no connecting line is drawn in the visualization 43. Relatedness is indicated by proximity only.

Cluster Spine Group Placement

Figure 21:
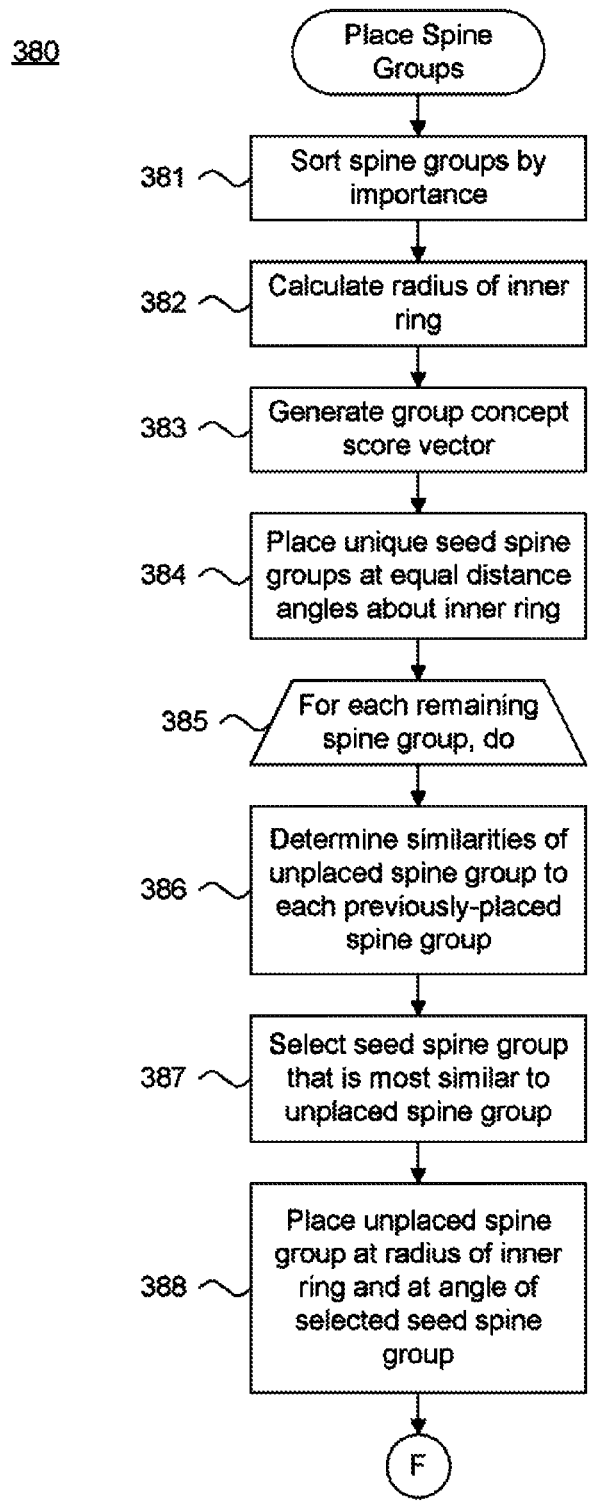
FIG. 21 is a flow diagram showing the routine for placing cluster spine groups for use in the method of FIG. 16.
Figure 21:
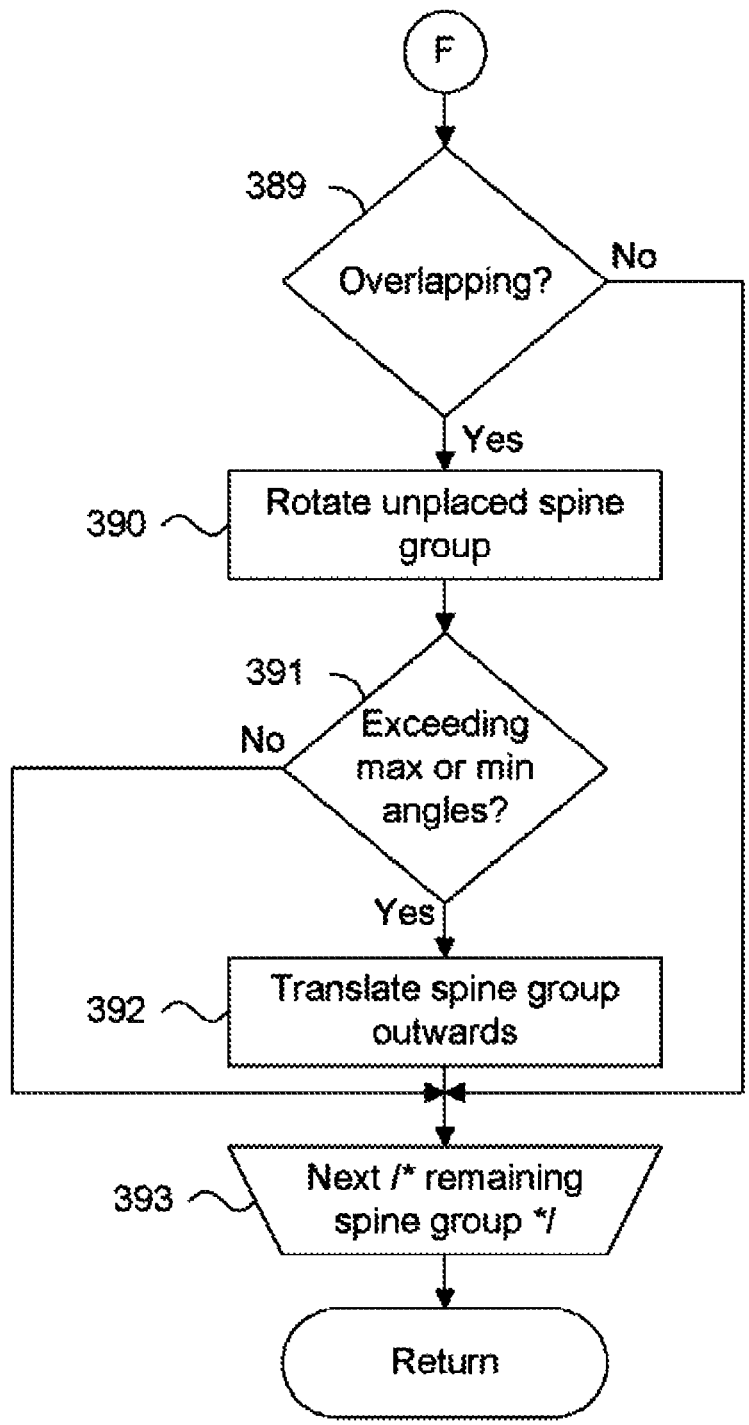

FIG. 21 is a flow diagram showing the routine 380 for placing spine groups 303 for use in the method 310 of FIG. 16. Spine groups 303 include the placed best fit spines 56 with grafted best fit spines 56 and loosely grafted singleton clusters 50. The purpose of this routine is to place the spine groups 303 within a radial layout defined within the visualization 43 in the display space in semantically meaningful order.

Figure 22:
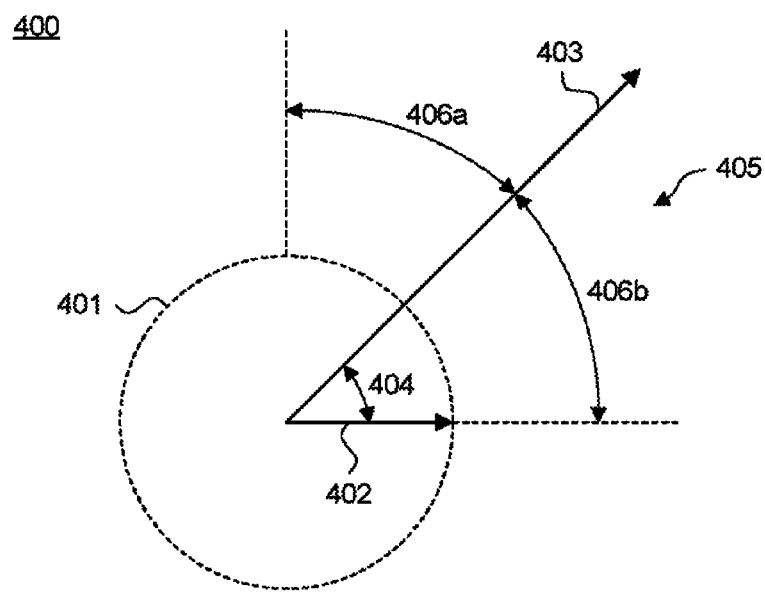
FIG. 22 is a data representation diagram showing, by way of example, a radially-oriented layout.

The spine groups 303 are first sorted by order of importance (block 381). In the described embodiment, the spine groups 303 are sorted by size and concept emphasized state, which corresponds to specific user-specified selections. The spine groups 303 are arranged circumferentially to a central shape defined logically within the visualization 43. In the described embodiment, a circle is defined within the visualization 43. Referring to FIG. 22, a data representation diagram shows, by way of example, a radially-oriented layout 400. The spine groups 303 are placed within a set of three concentric circles. An innermost circle 401 with radius 402 contains four distinct seed spine groups 303 placed along a central vector 403 evenly spaced within quarter circle sectors 405, although other numbers of seed spine groups 303 are possible. Within each sector 405, each of the four spine groups 303 are rotated to an initial target angle 404 along the central vector 403. Remaining spine groups 303 are placed within the sector 405 up to a maximum angle 406a or minimum angle 406b relative to the initial target angle 404. The spine groups 303 are moved outwards away from the center of the circle as necessary to avoid overlap, as further described below with reference to FIG. 24. The majority of the spine groups 303 fall within a primary circle logically defined outside the innermost circle 401. A third outermost circle can be used by a user interface to delineate an area for descriptive label placement.

Referring back to FIG. 21, the radius of the innermost circle 401 is calculated (block 382). In the described embodiment, the radius r is calculated in accordance to equation (1):

$$r = \frac{\text{Seeds} \times \text{Max}Y}{2} \cdot \pi \qquad (1)$$

where Seeds is a number of initial seed spine groups 303 to be placed circumferentially to the innermost circle 401 and MaxY is a maximum extent along a y-axis of the placed best fit candidate spine groups 303. A group concept score vector 304 is generated (block 383) by aggregating the cluster theme concepts for each spine group 303. In the described embodiment, the group concept score vector 304 is limited to the top 50 concepts based on score, although other limits could also be used. The set of unique seed spine groups 303 are selected and placed at equal distance angles about the innermost circle 401 (block 384). The unique seed spine groups 303 are chosen such that each unique seed spine group 303 is sufficiently dissimilar to the previously-placed unique seed spine groups 303. In the described embodiment, a cosine value of at least 0.2 is used, although other metrics of cluster spine group dissimilarity are possible. Each of the unique seed spine groups 303 are translated to the x-axes, where x=0.5×radius r and y=0.0, and are further rotated or moved outwards away from the innermost circle 401 to avoid overlap.

Figure 24:
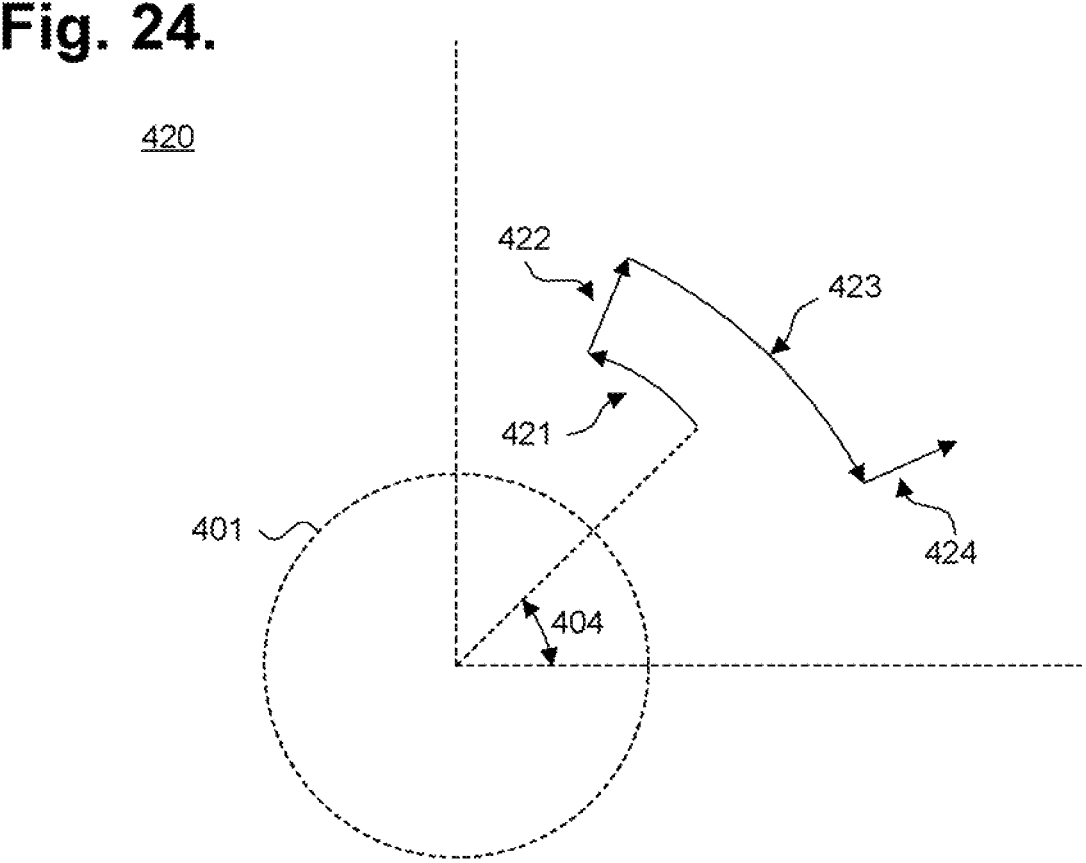
FIG. 24 is a data representation diagram showing, by way of example, cluster spine group overlap removal.

Each of the remaining spine groups 303 are iteratively processed (blocks 385-393), as follows. The similarities of each unplaced spine group 303 to each previously-placed spine group 303 are determined (block 386) and the seed spine group 303 that is most similar to the unplaced spine group 303 is selected (block 387). The unplaced spine group 303 is placed at the radius 402 of the innermost circle 401 at the angle 404 of the selected seed spine group 303 (block 388). If the unplaced spine group 303 overlaps any placed spine group 303 (block 389), the unplaced spine group 303 is rotated (block 390). However, if the unplaced spine group 303 exceeds the maximum angle 406a or minimum angle 406b after rotation (block 391), the unplaced spine group 303 is translated outwards and rotated in an opposite direction until the overlap is removed (block 392). Referring to FIG. 24, a data representation diagram 420 shows, by way of example, cluster spine group overlap removal. An overlapping cluster spine group 303 is first rotated in an anti-clockwise direction 421 up to the maximum angle 406a and, if still overlapping, translated in an outwards direction 422. Rotation 423 and outward translation 424 are repeated until the overlap is resolved. Referring back to FIG. 21, processing continues with each remaining unplaced spine group 303 (block 393), after which the routine then returns.

Cluster Spine Group Placement Example

Figure 23A:
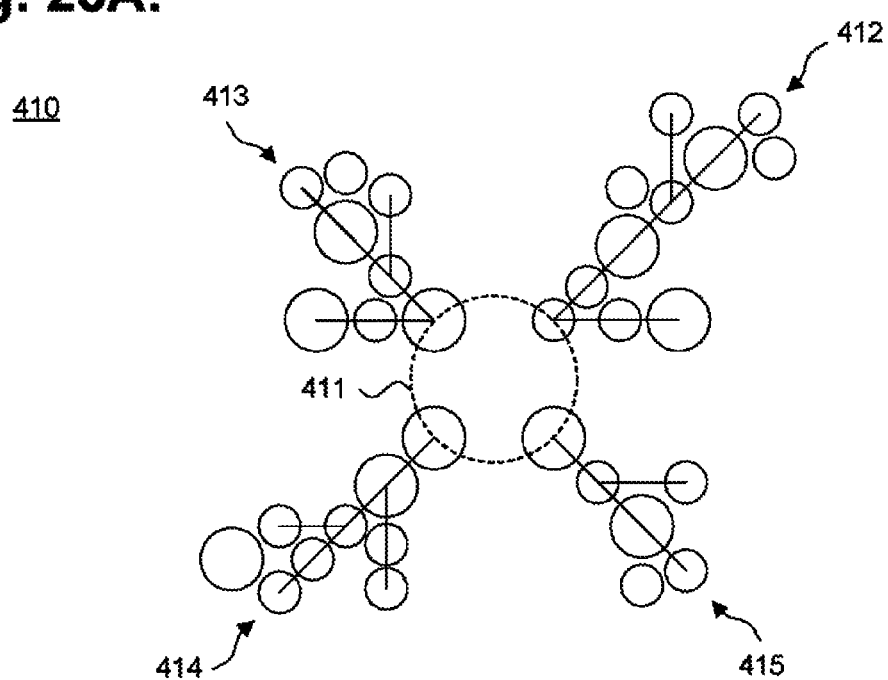
FIGS. 23A-C are data representation diagrams showing, by way of examples, cluster spine group placements.
Figure 23B:
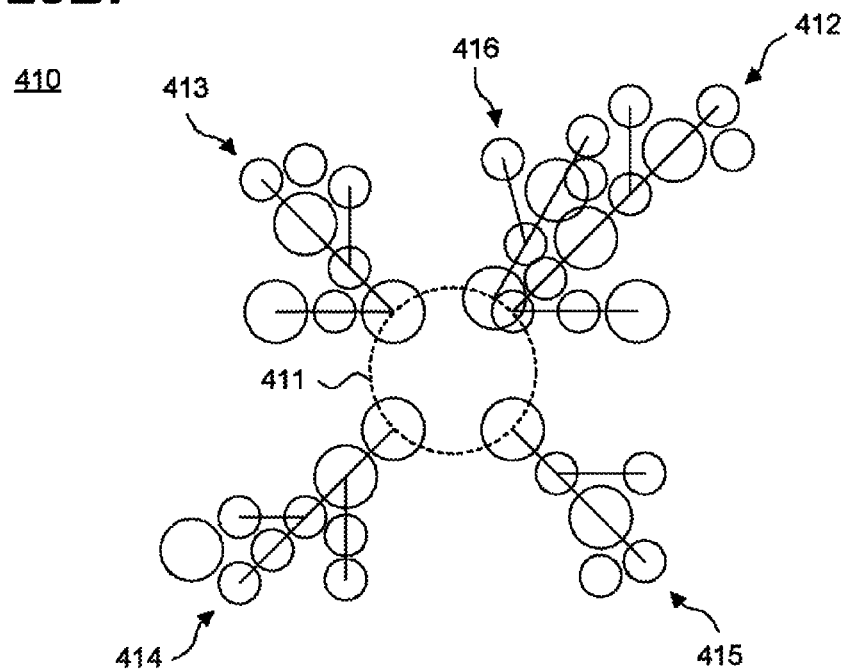
Figure 23C:
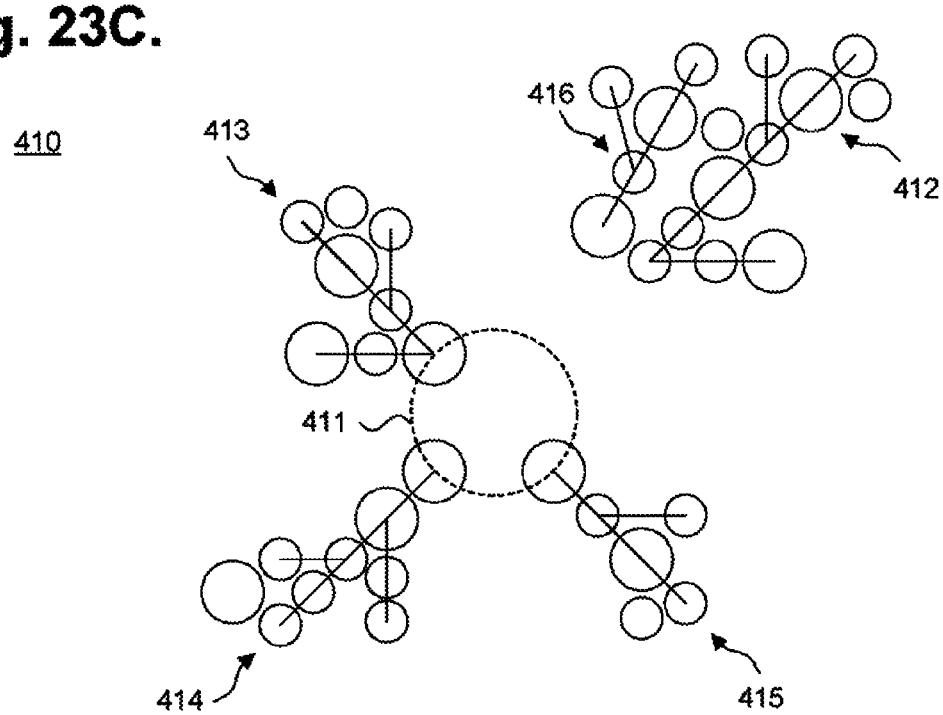

FIGS. 23A-C are data representation diagrams showing, by way of examples, cluster spine group placements 410. Referring first to FIG. 23A, an initial set of seed cluster spine groups 412-415 are shown evenly spaced circumferentially to an innermost circle 411. No clusters 60 assigned to each seed cluster spine group overlap the sector 405 in which the corresponding seed cluster spine group is placed. Referring next to FIG. 23B, an unplaced cluster spine group 416 overlaps already-placed cluster spine group 412. Rotating the unplaced cluster spine group 416 further is not possible, since the one or more of the clusters would cross over into the next sector 405. Referring finally to FIG. 23C, the entire set of cluster spine groups 412, 416 are translated outwards from the innermost circle 411 until no longer overlapping.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for cluster spine group arrangement, comprising:
   a set of spine groups each comprising one or more spines of clusters and at least one singleton cluster;
   a display; and
   a server comprising a central processing unit, memory, an input port to receive the spine groups, and an output port, wherein the central processing unit is configured to:
   identify unique spine groups within the set;
   place the unique spine groups in a center of a display; and
   arrange at least a portion of the remaining spine groups in the set extending radially from the unique spine groups in the display center.

2. A system according to claim 1, wherein the central processing unit places at least one of the remaining spine groups adjacent to one of the unique spine groups.

3. A system according to claim 1, wherein the central processing unit moves one or more of the unique spine groups to prevent overlap with one or more of the placed remaining spine groups.

4. A system according to claim 1, wherein the central processing unit determines the placement of each of the remaining spine groups to prevent overlap with one or more of the unique spine groups.

5. A system according to claim 1, wherein the central processing unit generates one such spine group by arranging two or more clusters of documents along a spine based on concepts of the clusters and grafting at least one other spine of clusters to one of the clusters arranged along the spine.

6. A system according to claim 5, wherein the central processing unit selects the two or more clusters for placement along the spine based on a best fit comprising a minimum similarity.

7. A system according to claim 5, wherein the cluster on which the other spine of clusters is grafted is most similar to the other spine of clusters.

8. A system according to claim 5, wherein the central processing unit places a different spine of clusters having less similarity to the clusters arranged along the spine adjacent one of the clusters arranged along with spine that is most similar to the different spine of clusters.

9. A system according to claim 1, wherein the central processing unit identifies the unique spine groups by determining a group concept score vector for each spine group based on concepts of the clusters in that group and identifying as the unique spine groups those spine groups that are dissimilar to the other spine groups based on the group concept scores.

10. A system according to claim 1, wherein the central processing unit places one or more labels adjacent to one or more of the remaining spine groups placed in the display and extending away from the display center.

11. A computer-implemented method for cluster spine group arrangement, comprising:
obtaining a set of spine groups each comprising one or more spines of clusters and at least one singleton cluster;
identifying unique spine groups within the set;
placing the unique spine groups in a center of a display; and
placing at least a portion of the remaining spine groups in the set extending radially from the unique spine groups in the display center.

12. A method according to claim 11, further comprising:
placing at least one of the remaining spine groups adjacent to one of the unique spine groups.

13. A method according to claim 11, further comprising:
moving one or more unique spine groups to prevent overlap with one or more of the placed remaining spine groups.

14. A method according to claim 11, further comprising:
determining the placement of each of the remaining spine groups to prevent overlap with one or more of the unique spine groups.

15. A method according to claim 11, further comprising:
generating one such spine group, comprising:
arranging two or more clusters of documents along a spine based on concepts of the clusters; and
grafting at least one other spine of clusters to one of the clusters arranged along the spine.

16. A method according to claim 15, further comprising:
selecting the two or more clusters for placement along the spine based on a best fit comprising a minimum similarity.

17. A method according to claim 15, wherein the cluster on which the other spine of clusters is grafted is most similar to the other spine of clusters.

18. A method according to claim 15, further comprising:
placing a different spine of clusters having less similarity to the clusters arranged along the spine adjacent one of the clusters arranged along with spine that is most similar to the different spine of clusters.

19. A method according to claim 11, further comprising:
identifying the unique spine groups, comprising:
determining a group concept score vector for each spine group based on concepts of the clusters in that group; and
identifying as the unique spine groups those spine groups that are dissimilar to the other spine groups based on the group concept scores.

20. A method according to claim 11, further comprising:
placing one or more labels adjacent to one or more of the placed remaining spine groups and extending away from the display center.

* * * * *